(12) United States Patent
Nagumo

(10) Patent No.: US 8,106,931 B2
(45) Date of Patent: Jan. 31, 2012

(54) SEMICONDUCTOR DEVICE, PRINT HEAD AND IMAGE FORMING APPARATUS

(75) Inventor: Akira Nagumo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 978 days.

(21) Appl. No.: 12/078,267

(22) Filed: Mar. 28, 2008

(65) Prior Publication Data

US 2008/0239056 A1 Oct. 2, 2008

(30) Foreign Application Priority Data

Mar. 30, 2007 (JP) ................................. 2007-091605

(51) Int. Cl.
*B41J 2/41* (2006.01)
*H01L 29/18* (2006.01)

(52) U.S. Cl. ........ 347/112; 347/111; 347/117; 347/118; 347/119; 347/122; 347/127; 347/128; 347/129; 347/130; 347/131; 347/132; 347/135; 257/88; 257/E33.001

(58) Field of Classification Search .......... 347/111–112, 347/117–119, 122, 127–132, 135, 237–239; 257/88, E33.001
See application file for complete search history.

(56) References Cited

U.S. PATENT DOCUMENTS

| | | | |
|---|---|---|---|
| 4,957,192 A * | 9/1990 | Weiler et al. ................. 188/71.9 |
| 5,177,405 A | 1/1993 | Kusuda et al. |
| 5,371,525 A * | 12/1994 | Murano .......................... 347/130 |
| 5,600,363 A * | 2/1997 | Anzaki et al. .................. 347/237 |
| 5,946,022 A * | 8/1999 | Kamimura ..................... 347/238 |
| 6,529,229 B2 * | 3/2003 | Nagumo ........................ 347/237 |
| 6,683,638 B2 * | 1/2004 | Sato ............................... 347/238 |
| 2007/0057259 A1 * | 3/2007 | Nagumo .......................... 257/67 |

FOREIGN PATENT DOCUMENTS

| | | |
|---|---|---|
| JP | 02-263668 | 10/1990 |
| JP | 2006-181742 | 7/2006 |
| JP | 2006-305892 | 11/2006 |
| JP | 2007-81081 | 3/2007 |

* cited by examiner

*Primary Examiner* — Ryan Lepisto
*Assistant Examiner* — Guy Anderson
(74) *Attorney, Agent, or Firm* — Rabin & Berdo, P.C.

(57) ABSTRACT

A semiconductor device, a print head comprising the semiconductor device and an image forming apparatus comprising the print head are supplied which are able to reduce cost through miniaturizing element size and minishing chip area. The semiconductor device comprises a plurality of light emitting elements; and a shift register circuit that has output terminals respectively corresponding to the plurality of light emitting elements and stores emitting-light instruction data of the light emitting elements, wherein each light emitting element has a first electrode and a second electrode to that lightening electricity of the light emitting element flows, and a third electrode for controlling the light emitting element whether to emit light, the output terminals of the shift register circuit are respectively connected with the third electrodes of the corresponding light emitting element.

12 Claims, 12 Drawing Sheets

SEMICONDUCTOR DEVICE, PRINT HEAD AND IMAGE FORMING APPARATUS

BACKGROUND OF THE INVENTION

1. Field of the Invention

The invention relates to a semiconductor device constructed by arranging a plurality of light emitting elements and relates to a print head comprising the semiconductor device and an image forming apparatus comprising the print head.

2. Related Background Art

FIG. 13 is a diagram showing a structure of conventional LED head as a print head using LED serving as light emitting element.

As shown by the FIG. 13, in a LED head 219 furnished in a printer that is able to perform a print on paper of e.g. A4 size and has a resolution of 600 dots per inch, a print data signal HD-DATA is inputted to the LED head 219 together with a clock signal HD-CLK, and bit data of 4992 dots are sequentially send to a shift register circuit composed of flip-flop circuits of FF1, FF2, ..., FF4992.

Next, in the LED head 219, when a latch signal HD-LOAD is inputted to the LED head 219, the bit data are latched by respective latch circuits of LT1, LT2, ..., LT4992. Continuously, in the LED head 219, through the bit data and a print drive signal HD-STB-N, in the light emitting elements of LD1, LD2, ..., LD4992, these light emitting elements corresponding to dot data with high level emit light. Moreover, G0 is an inverter circuit; G1, G2, ..., G4992 are pre-buffer circuits; Tr1, Tr2, ..., Tr4992 are switch elements; and VDD is a power source (for example, refer to Patent document 1).

Patent document 1: Japan patent publication H2-263668.

However, the above-stated conventional LED head comprises a great many LEDs, and each LED is connected with a transistor in which strong drive electricity corresponding to drive ability flows. Though the LED may simplify the structure of its own so as to reduce electricity for emitting light, it is necessary to make strong drive electricity flow into the transistor in order to drive the LED. Thus, there are such problems: the drive element such as the transistor and the like becomes large-scale, so it possesses a larger chip area, and the cost of the drive element rises.

SUMMARY OF THE INVENTION

It is, therefore, an object of the invention to provide a semiconductor device and a print head comprising the semiconductor device capable of solving the above problem. That is, the present invention supplies a semiconductor device and a print head that can inhibit a rise of cost through miniaturizing element size so as to lessen chip area.

According to the present invention, there is provided a semiconductor device, comprising a plurality of light emitting elements; and a shift register circuit that has output terminals respectively corresponding to the plurality of light emitting elements and stores emitting-light instruction data of the light emitting elements, wherein each light emitting element has a first electrode and a second electrode to that lightening electricity of the light emitting element flows, and a third electrode for controlling the light emitting element whether to emit light, and the output terminals of the shift register circuit are respectively connected with the third electrodes of the corresponding light emitting element.

According to the structure, because there is the third electrode for controlling whether to make the light emitting element emit light and the plural output terminals of shift register circuit are connected with the third electrodes of corresponding light emitting elements, it becomes unnecessary to furnish a means of light emitting element needed in the conventional semiconductor device, that is, a switching means such as transistor or the like outputting strong drive electricity. Therefore, when forming the semiconductor device, it becomes unnecessary to possess large chip area. So that it is possible to realize to reduce cost of the semiconductor device.

Moreover, the semiconductor device may further comprise a drive electricity generating circuit that generates drive electricity for making the lightening electricity flow between the first electrode and the second electrode of the light emitting element on the basis of an inputted voltage.

Further, according to the present invention, there is also provided a semiconductor device, comprising a shift register circuit that has a plurality of output terminals; and a plurality of light emitting elements respectively corresponding to the plurality of output terminals of the shift register circuit, wherein each light emitting element has a first electrode and a second electrode to that lightening electricity of the light emitting element flows, and a third electrode for controlling the light emitting element whether to emit light, the output terminals of the shift register circuit are connected with the third electrodes of the corresponding light emitting elements, and the shift register circuit stores emitting-light instruction data of the plurality of light emitting elements corresponding to the output terminals.

According to the structure, because the drive electricity generating circuit generates drive electricity for making light emission electricity flow into between the first electrode and the second electrode of the light emitting element on the basis of the inputted voltage, it is possible to correct character unevenness of the light emitting element caused by a photon deficiency of crystal or by other problem. Therefore, it is possible to use luminous thyristor that can not be used in the conventional semiconductor device so as to obviously improve throughput when manufacturing semiconductor device. As a result, it is possible to reduce manufacture cost of the light emitting element.

Moreover, the semiconductor device may further comprise a drive electricity generating circuit that generates drive electricity for making the lightening electricity flow between the first electrode and the second electrode of the light emitting element on the basis of an inputted voltage.

Furthermore, according to the present invention, there is provided a print head which performs a light irradiation for forming an electrostatic latent image onto a photosensitive drum, comprising a plurality of semiconductor devices connected in a cascade structure, wherein each semiconductor device includes a plurality of light emitting elements; and a shift register circuit that has output terminals respectively corresponding to the plurality of light emitting elements and stores emitting-light instruction data of the light emitting elements, wherein each light emitting element has a first electrode and a second electrode to that lightening electricity of the light emitting element flows, and a third electrode for controlling the light emitting element whether to emit light, and the output terminals of the shift register circuit are respectively connected with the third electrodes of the corresponding light emitting element.

According to the structure, because there is the third electrode for controlling whether to make the light emitting element emit light and the plural output terminals of shift register circuit are connected with the third electrodes of corresponding light emitting elements, it becomes unnecessary to furnish a switching means such as transistor or the like outputting strong drive electricity. Therefore, when forming the semiconductor device, it becomes unnecessary to possess large chip area. So that it is possible to realize to reduce cost of the print head.

Moreover, the print head may further comprise a drive electricity generating circuit that generates drive electricity for making the lightening electricity flow between the first electrode and the second electrode of the light emitting element on the basis of an inputted voltage.

Moreover, the print head also may further comprise a plurality of the drive electricity generating circuits; and a terminal resistor, wherein each of the drive electricity generating circuits connected in common by wire for supplying the voltage, and the wire is intermitted by the terminal resistor.

Furthermore, according to the present invention, there is also provided a print head which performs a light irradiation for forming an electrostatic latent image onto a photosensitive drum, comprising a plurality of semiconductor devices connected in a cascade structure, wherein each semiconductor device includes a shift register circuit that has a plurality of output terminals; and a plurality of light emitting elements respectively corresponding to the plurality of output terminals of the shift register circuit, wherein each light emitting element has a first electrode and a second electrode to that lightening electricity of the light emitting element flows, and a third electrode for controlling the light emitting element whether to emit light, the output terminals of the shift register circuit are connected with the third electrodes of the corresponding light emitting elements, and the shift register circuit stores emitting-light instruction data of the plurality of light emitting elements corresponding to the output terminals.

According to the structure, because the drive electricity generating circuit generates drive electricity for making light emission electricity flow into between the first electrode and the second electrode of the light emitting element on the basis of the inputted voltage, it is possible to correct character unevenness of the light emitting element caused by a photon deficiency of crystal or by other problem. Therefore, it is possible to use thing that can not be used when manufacturing the conventional print head so as to obviously improve throughput. As a result, it is possible to reduce manufacture cost of the light emitting element.

Moreover, the print head may further comprise a drive electricity generating circuit that generates drive electricity for making the lightening electricity flow between the first electrode and the second electrode of the light emitting element on the basis of an inputted voltage.

Moreover, the print head also may further comprise a plurality of the drive electricity generating circuits; and a terminal resistor, wherein each of the drive electricity generating circuits connected in common by wire for supplying the voltage, and the wire is intermitted by the terminal resistor.

Furthermore, according to the present invention, there is provided an image forming apparatus, comprising a print head which performs a light irradiation for forming an electrostatic latent image onto a photosensitive drum; and a print controlling section which is connected with the print head, wherein the print head comprises a plurality of semiconductor devices connected in a cascade structure, wherein each semiconductor device includes a plurality of light emitting elements; and a shift register circuit that has output terminals respectively corresponding to the plurality of light emitting elements and stores emitting-light instruction data of the light emitting elements, wherein each light emitting element has a first electrode and a second electrode to that lightening electricity of the light emitting element flows, and a third electrode for controlling the light emitting element whether to emit light, and the output terminals of the shift register circuit are respectively connected with the third electrodes of the corresponding light emitting element.

Furthermore, according to the present invention, there is also provided an image forming apparatus comprising a print head which performs a light irradiation for forming an electrostatic latent image onto a photosensitive drum; and a print controlling section which is connected with the print head, wherein the print head comprises a plurality of semiconductor devices connected in a cascade structure, wherein each semiconductor device includes a shift register circuit that has a plurality of output terminals; and a plurality of light emitting elements respectively corresponding to the plurality of output terminals of the shift register circuit, wherein each light emitting element has a first electrode and a second electrode to that lightening electricity of the light emitting element flows, and a third electrode for controlling the light emitting element whether to emit light, the output terminals of the shift register circuit are connected with the third electrodes of the corresponding light emitting elements, and the shift register circuit stores emitting-light instruction data of the plurality of light emitting elements corresponding to the output terminals.

EFFECTS OF THE PRESENT INVENTION

According to the present invention, it is possible to inhibit a rise of cost through miniaturizing element size so as to lessen chip area.

The above and other objects and features of the present invention will become apparent from the following detailed description and the appended claims with reference to the accompanying drawings.

DETAILED DESCRIPTION OF THE PREFERRED EMBODIMENTS

Best embodiments of the invention will be described in detail hereinbelow with reference to the drawings.

Embodiment 1

Figure 1:
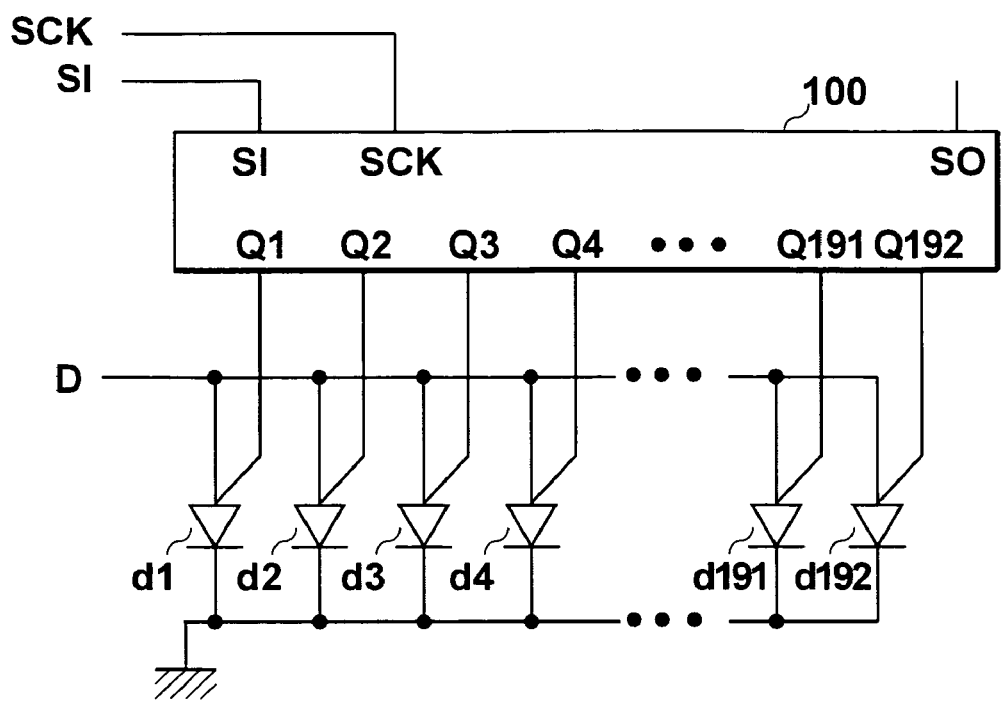
FIG. 1 is a circuit diagram showing a structure of semiconductor device to construct a print head in embodiment 1 of the present invention.

FIG. 1 is a circuit diagram showing a structure of semiconductor device to construct a print head in embodiment 1 of the present invention.

Figure 13:
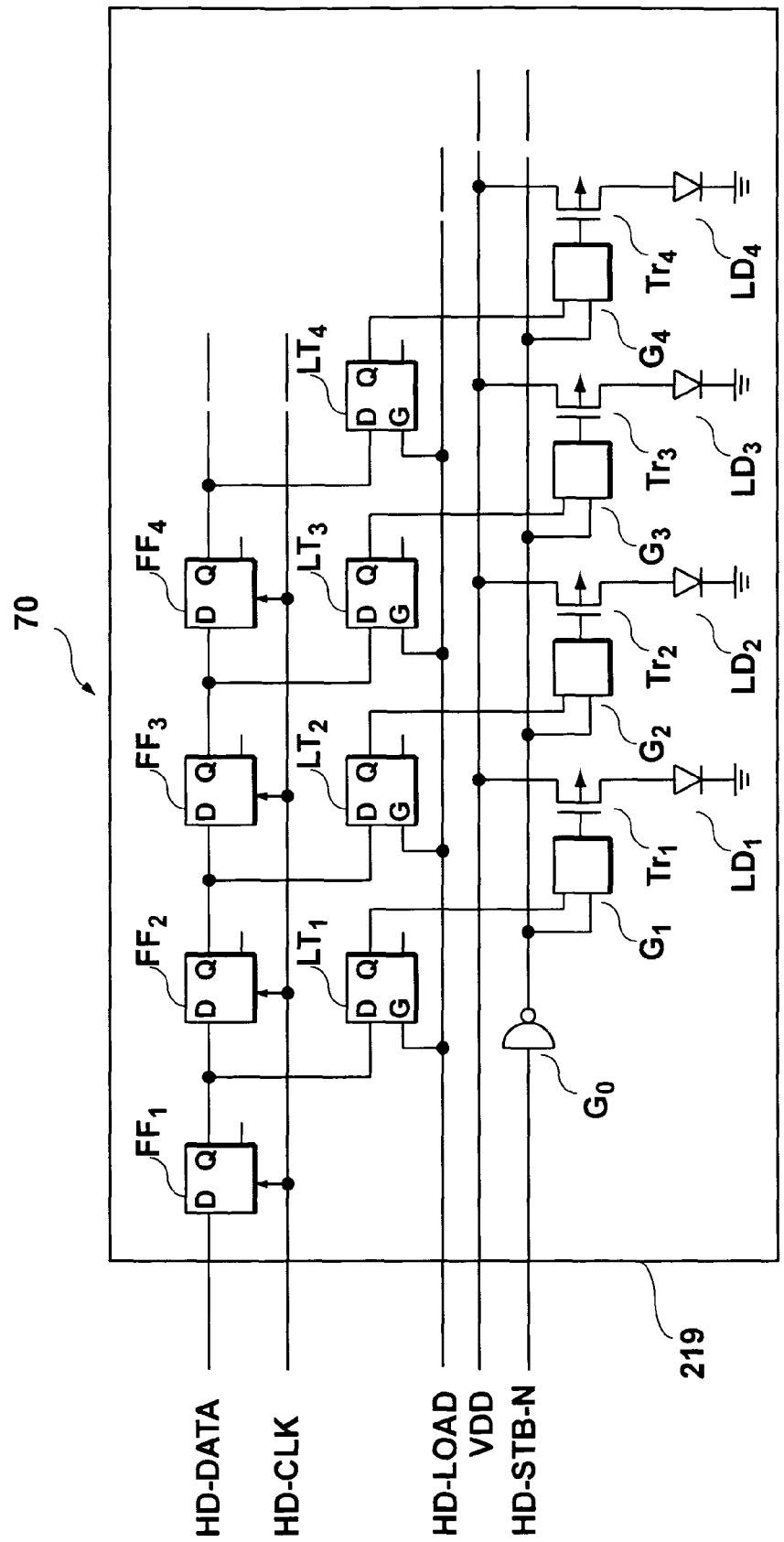
FIG. 13 is a circuit diagram showing a structure of a conventional LED head.

As shown by the FIG. 1, a semiconductor device to construct a print head in embodiment 1 has a shift register circuit 100 and 192 pieces of luminous thyristors of luminous thyristors d1, d2, . . . , d192 serving as light emitting element. In the shift register circuit 100, 192 pieces of flip-flop circuits FF to construct conventional LED head shown by FIG. 13 are connected in series. The respective flip-flop circuits FF includes data output terminals Q1, Q2, . . . , Q192 furnished in the shift register circuit 100 and mentioned below, and keeps a voltage level for supplying voltage to make the luminous thyristors d1, d2, . . . , d192 emit light. Further, the output terminal Qn of the flip-flop circuits FF is outputted by shifting and inputting signal of output terminal Qn-1 serving as a fore segment.

Further, the shift register circuit 100 includes a serial data input terminal SI, a clock terminal SCK, a serial data output terminal SO and data output terminals Q1-Q192. In the case to connect plural segments of shift register circuits 100 in a cascade state, the serial data input terminal SI of the shift register circuit 100 of first segment is connected with a serial data output terminal of a print controlling section (not shown) to control print, the serial data input terminal SI of the shift register circuit 100 of other segment is connected with the serial data output terminal SO of fore segment. The clock terminal SCK is connected with a clock terminal of the print controlling section. In the case to connect plural segments of shift register circuits 100 in a cascade state, the serial data output terminal SO is connected with the serial data input terminal SI of the back segment. The data output terminals Q1-Q192 are respectively connected with gate terminals of the luminous thyristors d1, d2, . . . , d192.

The luminous thyristors d1, d2, . . . , d192 are light emitting elements used as print use light source, and emit light when electricity flows between anode and cathode, like LED. The luminous thyristors d1, d2 , . . . , d192 is formed by using compound semiconductor such as GaAs and the like. In fact, it may use GaN film made by sticking element placed on GaAs film onto shift register of silicon manufacture.

Figure 2A:
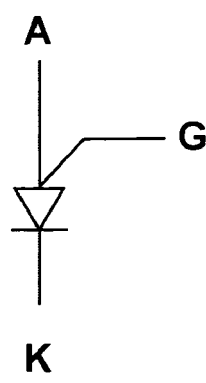
FIG. 2A is a first diagram for explaining a basic structure of a luminous thyristor.
Figure 2B:
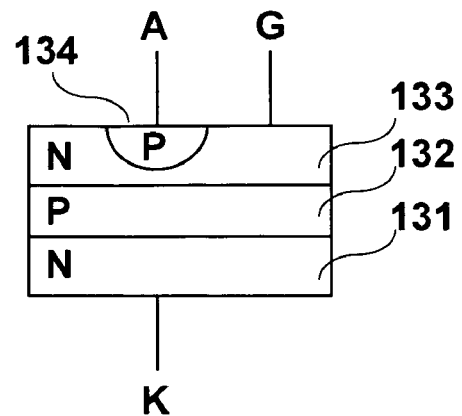
FIG. 2B is a second diagram for explaining a basic structure of a luminous thyristor.

FIG. 2A and 2B are diagrams for explaining a basic structure of a luminous thyristor.

The luminous thyristors d1, d2, . . . , d192, as shown by the FIG. 2A, have anode terminal A connected with anode electrode, cathode terminal K connected with cathode electrode, and gate terminal G connected with gate electrode. Further, as shown by the FIG. 2B, the luminous thyristors d1, d2, . . . , d192 have a PNPN structure through forming a P type layer 132 onto a N type GaAs layer 131 in a well-known Metal Organic Chemical Vapor Deposition (MO-CVD) using organic metal, forming a N type layer 133 onto the P type layer 132, and forming a P type layer 134 onto the N type layer 133 by using a photolithography method to selectively diffuse P type impurity such as Zinc Or the like. On the P type layer 134, the above-mentioned anode electrode is furnished; on the bottom surface portion of the N type GaAs layer 131, the above-mentioned cathode electrode is furnished; and on a part of upper surface portion of N type layer 133, the above-mentioned gate electrode is furnished.

The gate terminal G controls a voltage between anode and cathode while electricity flows between the anode and the cathode, the voltage supplied between the anode and the cathode becomes a voltage which adds a diffusion potential to gate voltage. Therefore, a condition to turn on electricity flowing between the anode and the cathode can be freely controlled by the voltage supplied on the gate.

The luminous thyristors d1, d2, . . . , d192 are connected with a data output terminal D of print controlling section while anodes are connected, the cathode terminals are connected with ground.

Figure 3:
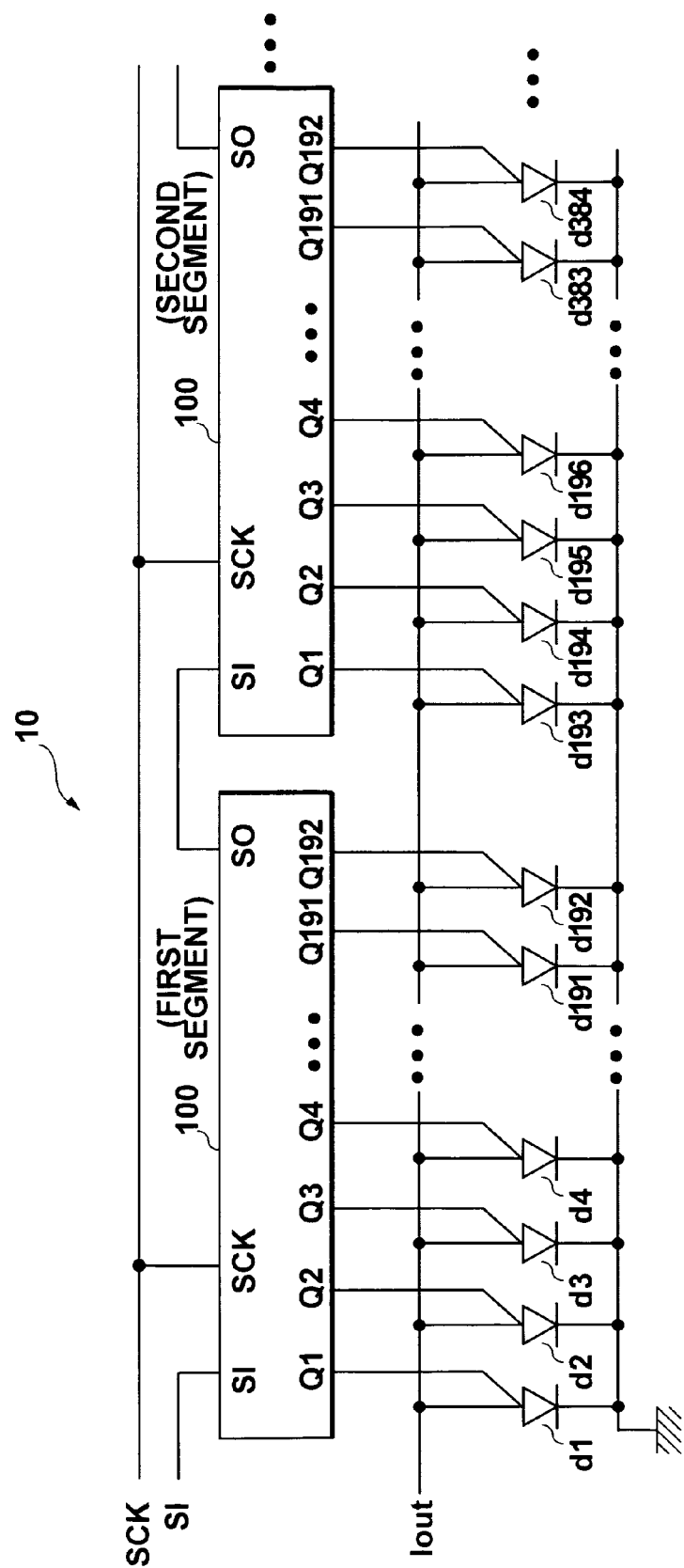
FIG. 3 is a circuit diagram showing a structure of print head in embodiment 1 of the present invention.

FIG. 3 is a circuit diagram showing a structure of print head in embodiment 1 of the present invention.

As shown by the FIG. 3, a print head 10 includes 26 pieces of semiconductor devices shown by the FIG. 1, the shift register circuits 100 to construct the semiconductor device are connected in a cascade state of 26 segments. The serial data input terminal SI of shift register circuit 100 of first segment is connected with a serial data output terminal of a print controlling section, further, the serial data output terminal SO is connected with the serial data input terminal SI of the shift register circuit 100 of second segment. The serial data input terminal SI of the shift register circuit 100 of segments from second to twenty-sixth are respectively connected with the serial data output terminal SO of shift register circuit 100 of fore segment. Because each segment has 192 pieces of data output terminals in the shift register circuit 100, in all of the 26 segments of shift register circuits 100, the print head 10 has 4992 pieces of data output terminals. Therefore, the print head 10 has 4992 pieces of luminous thyristors and controls these luminous thyristors to drive. Moreover, the cathode terminal of each thyristor is ground.

Next, it is to explain operation of print head in the embodiment 1 of the present invention.

Figure 4:
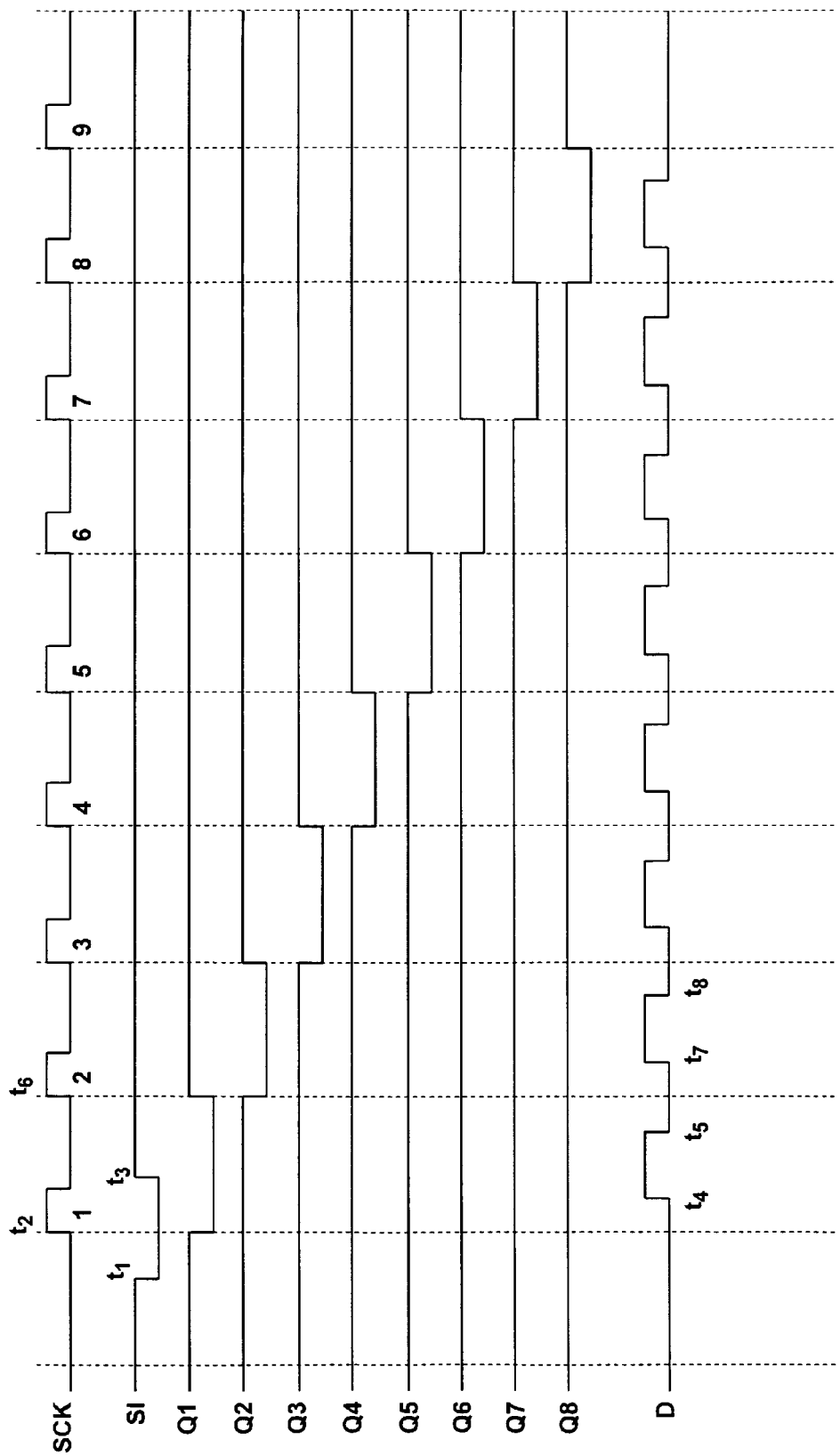
FIG. 4 is a timing chart for explaining operation of print head in embodiment 1 of the present invention.

FIG. 4 is a timing chart for explaining operation of print head in embodiment 1 of the present invention.

As an example, the FIG. 4 shows a movement status of one line while printing operation of printer and shows operation in the case to make the luminous thyristors d1, d2, . . . , d8 in the luminous thyristors d1, d2, . . . , d192 of FIG. 1 emit light sequentially. Further, though it is not shown in the FIG. 4, a presetting process of shift register circuit 100 is performed as a preparation operation while power source of printer is turned on. In the process, the voltage supplied on the serial data input terminal SI in FIG. 1 is set into High level, clock pulses whose number corresponds to the segment number of the shift register circuits are inputted into the clock terminal SCK. Thereby, all voltages supplied to the data output terminals Q1-Q192 of the shift register circuit 100 becomes High level.

As shown by the FIG. 4, at time t1, a signal of Low level voltage is supplied to the serial data input terminal SI of the shift register circuit 100 of the first segment before a movement of one line part. Next, at time t2, first clock pulse is inputted to the clock terminal SCK (at that time, the first pulse is inputted to clock terminals SCK of the segments from first to twenty-sixth), then, the voltage supplied to the serial data input terminal SI is taken into the flip-flop circuit of the first segment of the shift register circuit 100. Thus, after delayed a little time, the voltage of the data output terminal Q1 serving as an output destination of the flip-flop circuit of the first segment is changed from High level to Low level. Thereby, the gate potential of the luminous thyristor d1 drops. After the voltage supplied to the clock terminal becomes High level by the first clock pulse, at time t3, the voltage supplied to the serial data input terminal SI returns to High level again.

At time t4, when the signal of the data input terminal D becomes High level, a potential difference between the anode and the cathode of the luminous thyristor d1 happens. Through trigger electricity caused by the potential difference, the luminous thyristor d1 turns on to become a lightening state. The lightening state happened by the luminous thyristor d1 is mainly generated by the electricity flowing between the anode and the cathode, in order to turn off the luminous thyristor d1 once turned on, it is necessary to drop the voltage supplied between the anode and the cathode into zero. Therefore, at time t5, the potential of the data input terminal D is set to Low level.

Moreover, as shown by the FIG. 4, in order to make the luminous thyristor d1 emit light, at the time t4, the signal of the data input terminal D is set to High level; in order to make the luminous thyristor d1 black out, at the time t5, the signal of the data input terminal D is set to Low level. In the case that the luminous thyristor d1 does not need to emit light, the signal of the data input terminal D may be kept in Low level from the time t4 to the time t5. Thus, through changing the value of the signal of the data input terminal D, the lightening state and the blackening state of the luminous thyristor d1 can be switched. Therefore, not only it is possible to control the lightening time according to the time from the t4 to t5, but also it is possible to arbitrarily adjust lightening quantity through adjusting drive electricity value of the thyristor in emitting light.

Then, at time t6, when second clock pulse is inputted into the clock terminal SCK, because the voltage supplied to the serial data input terminal SI becomes High level, after delayed a little time, on the one hand, the voltage of the data output terminal Q1 is changed from Low level to High level, on the other hand, the voltage of the data output terminal Q2 is changed from High level to Low level.

At time t7, when the signal of the data input terminal D becomes High level, a potential difference between the anode and the cathode of the luminous thyristor d2 happens. Through trigger electricity caused by the potential difference, the luminous thyristor d2 turns on to become a lightening state. The lightening state happened by the luminous thyristor d2 is mainly generated by the electricity flowing between the anode and the cathode, in order to turn off the luminous thyristor d2 once turned on, it is necessary to drop the voltage supplied between the anode and the cathode into zero. Therefore, at time t8, the potential of the data input terminal D is set to Low level.

As shown by the FIG. 4, the clock signal supplied to the clock terminal SCK is High level marked by symbols 1, 2, 3, 4, 5, 6, 7, 8. Further, according to the clock signal, the respective voltages supplied to the data output terminals Q1, Q2, Q3, Q4, Q5, Q6, Q7, Q8 become Low level only by one time in an order of the data output terminals Q1, Q2, Q3, Q4, Q5, Q6, Q7, Q8. Except the data output terminals whose levels are Low, other data output terminals are High level. Therefore, when the signal of the data input terminal D is High level, in the luminous thyristors d1, d2, . . . , d4992, only the data output terminals Q1-Q8 whose output voltages are Low level 192 are selected to emit light.

In the above explanation, on the one hand, in order to turn on the luminous thyristors d1, d2, . . . , d4992, it is possible to only supply a voltage having a predetermined voltage value between the anode and the cathode along an ordinal direction; on the other hand, in order to turn off the luminous thyristors d1, d2, . . . , d4992, it is sufficient to only supply a voltage below the predetermined voltage value between the anode and the cathode along an ordinal direction. Therefore, through setting the voltage into zero or supplying a voltage between the anode and the cathode along a converse direction, it is possible to turn off the luminous thyristor.

Though the above stated operation represents lightening operation of the luminous thyristors d1-d8, likewise, the lightening operation of the luminous thyristors d9-d192 is also performed, and the lightening operation of the luminous thyristors d193-d4992 connected with the shift register circuits from the second segment to the twenty-sixth segment is also performed.

According to the embodiment 1, because the electricity to flow into the luminous thyristors d1-d4992 mainly flows into between the anode and the cathode, and only a little electricity flows to the gate terminal G used for dictating lightening state and blackening state, strong drive ability is not needed in the respective data output terminals Q1-Q192 of the shift register circuit 100 for making the luminous thyristors d1, d2, . . . , d192 emit light. Therefore, it becomes unnecessary to furnish switching means such as transistors (Tr1, Tr2, Tr3, . . . ) having a strong ability for directly switching on or off drive electricity of LED (LD1, LD2, LD3, . . . ) serving as light emitting elements needed in the conventional semiconductor device shown in the FIG. 13.

Therefore, the semiconductor device of the embodiment 1 does not need to possess large chip area, so that it can realize miniaturization of apparatus and a reduction of cost. Thus, the print head containing the semiconductor device also can realize miniaturization of apparatus and a reduction of cost.

Further, according to the embodiment 1, because the anodes of the luminous thyristors d1, d2, . . . , d192 are connected each other, it is possible to simply control electricity supplied to respective light emitting elements when sequentially emitting light.

Furthermore, according to the embodiment 1, because the plural shift register circuits 100 are connected in a cascade state, it is possible to easily form print head with a large size.

Embodiment 2

Figure 5:
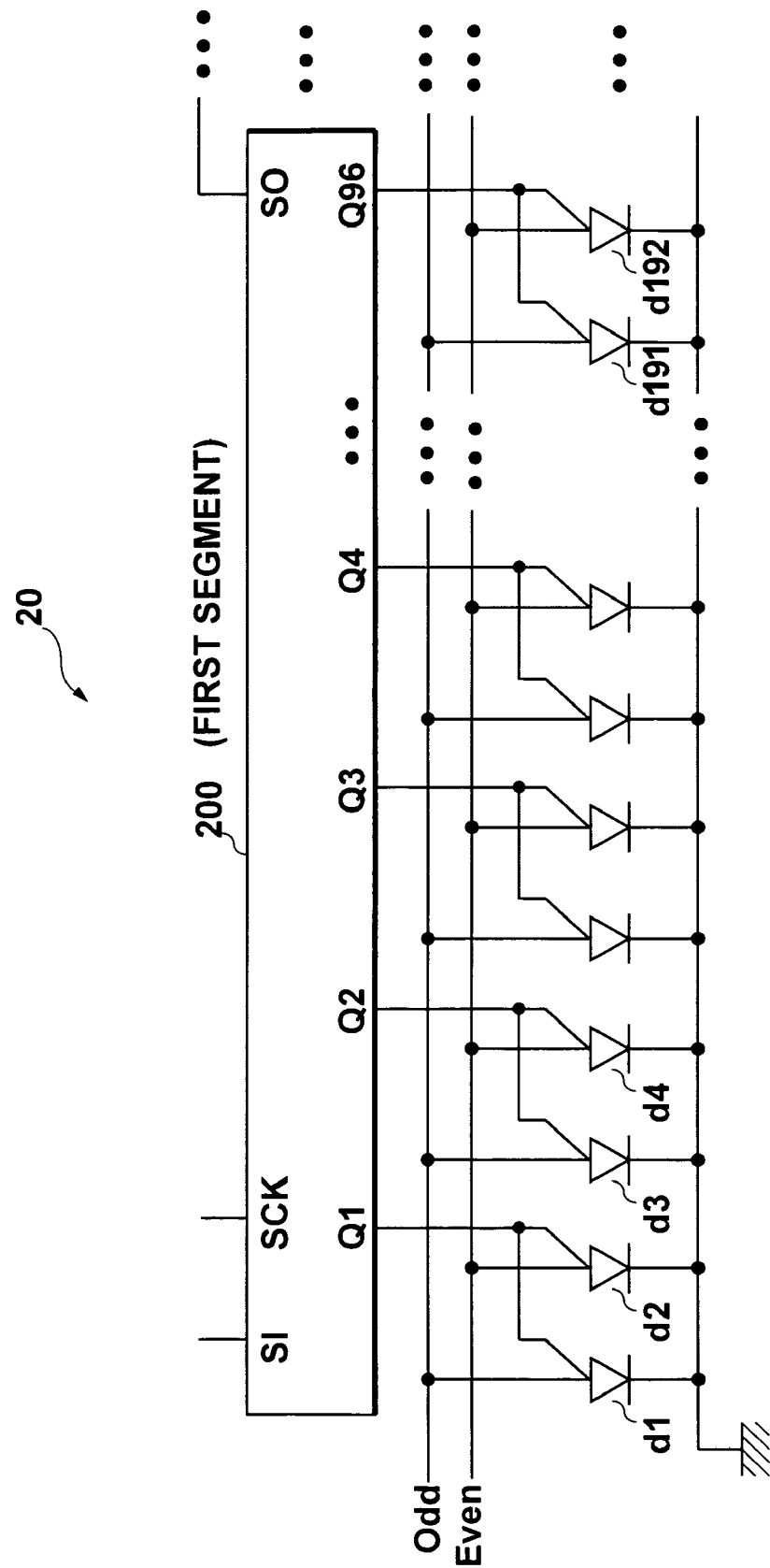
FIG. 5 is a circuit diagram showing a structure of print head in embodiment 2 of the present invention.

FIG. 5 is a circuit diagram showing a structure of print head in embodiment 2 of the present invention.

As shown by the FIG. 5, a semiconductor device to construct a print head 20 in embodiment 2 has a shift register circuit 200 and 192 pieces of luminous thyristors of luminous thyristors d1, d2, . . . , d192 serving as light emitting element. In the shift register circuit 200, data output terminals Q1, Q2, . . . , Q96 are furnished. The data output terminals Q1, Q2, . . . , Q96 are respectively connected with gate terminal G of adjoining two luminous thyristors. For example, the data output terminal Q1 is connected with the gate terminal G of the luminous thyristors d1 and d2, the data output terminal Q2 is connected with the gate terminal G of the luminous thyristors d3 and d4. Further, in the shift register circuit 200, 96 pieces of the flip-flop circuits FF of the embodiment 1 are connected in series.

The luminous thyristors d1, d2, . . . , d192 are the same as that in the embodiment 1. In the luminous thyristors d1, d2, . . . , d192, anode terminals A of the luminous thyristors d1, d3, . . . , d191 are connected each other and are connected with a data input terminal Odd of a print controlling section (not shown). Anode terminals A of the luminous thyristors d2, d4, . . . , d192 are connected each other and are connected with a data input terminal Even of the print controlling section.

The print head 20 of the embodiment 2 includes 26 pieces of semiconductor devices shown by the FIG. 1, the shift register circuits 200 to construct the semiconductor device are connected in a cascade state of 26 segments. The serial data input terminal SI of shift register circuit 200 of first segment is connected with a serial data output terminal of a print controlling section, further, the serial data output terminal SO is connected with the serial data input terminal SI of the shift register circuit 200 of second segment. The serial data input terminal SI of the shift register circuit 200 of segments from second to twenty-sixth are respectively connected with the serial data output terminal SO of shift register circuit 200 of fore segment. Because each segment has 96 pieces of data output terminals in the shift register circuit 200, in all of the 26 segments of shift register circuits 200, the print head 20 has 2496 pieces of data output terminals. Therefore, the print head 20 has 4992 pieces of luminous thyristors and controls these luminous thyristors to drive. Moreover, the cathode terminal of each thyristor is ground.

Next, it is to explain operation of print head in the embodiment 2 of the present invention.

Figure 6:
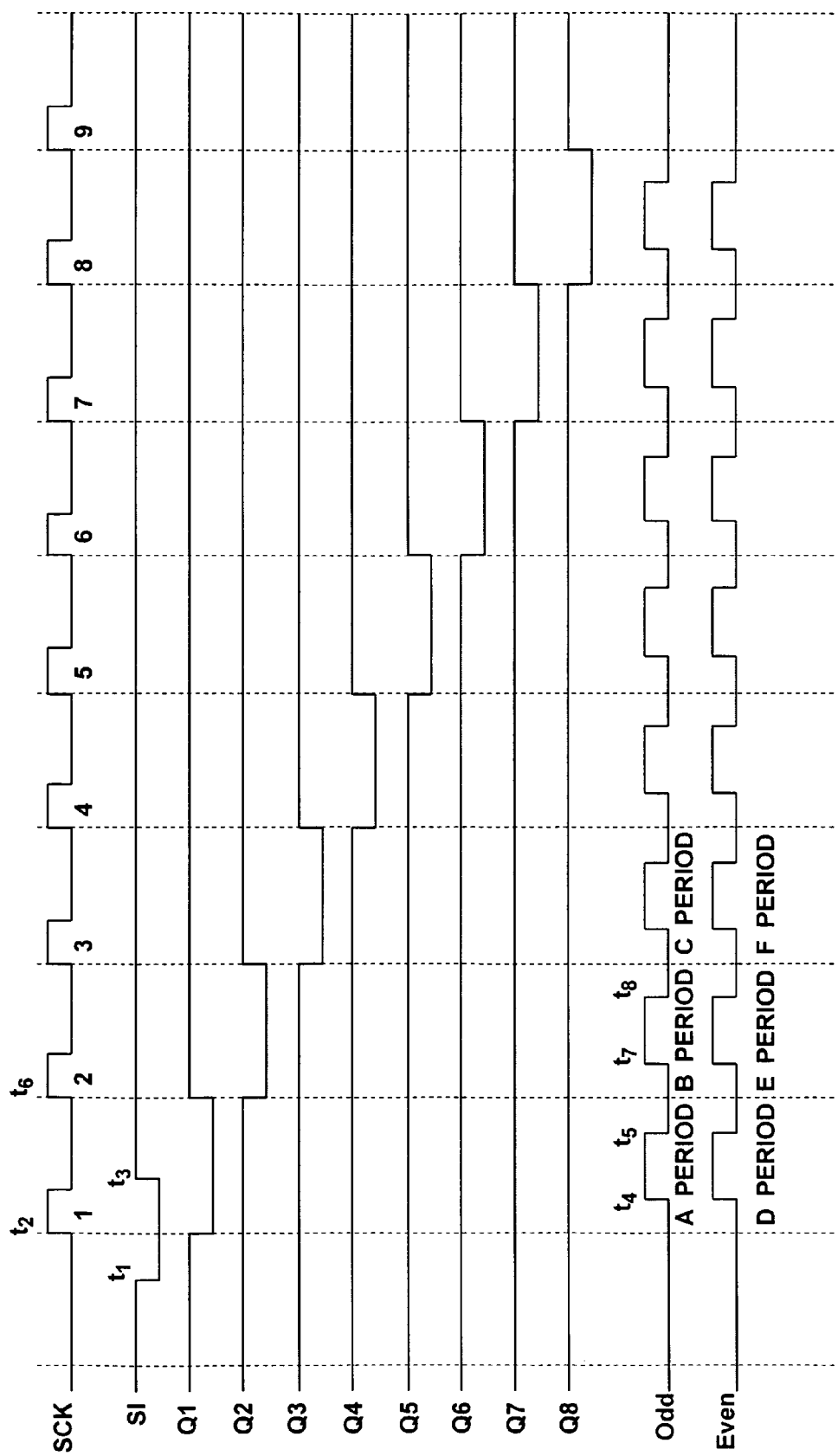
FIG. 6 is a timing chart for explaining operation of print head in embodiment 2 of the present invention.

FIG. 6 is a timing chart for explaining operation of print head in embodiment 2 of the present invention.

As an example, the FIG. 6 shows a movement status of one line while printing operation of printer and shows operation in the case to make the luminous thyristors d1, d2, . . . , d8 in the luminous thyristors d1, d2, . . . , d192 of FIG. 5 emit light sequentially. Moreover, though it is not shown in the FIG. 6, a presetting process of shift register circuit 200 is performed as a preparation operation while power source of printer is turned on. In the process, the voltage supplied on the serial data input terminal SI in FIG. 5 is set into High level, clock pulses whose number corresponds to the segment number of the shift register circuits are inputted into the clock terminal SCK. Thereby, all voltages supplied to the data output terminals Q1-Q96 of the shift register circuit 200 becomes High level.

As shown by the FIG. 6, at time t1, a voltage supplied to the serial data input terminal SI becomes Low level from High level before a movement of one line part. Next, at time t2, first clock pulse is inputted to the clock terminal SCK. Then, the Low level voltage supplied to the serial data input terminal SI is taken into the flip-flop circuit of first segment of the shift register circuit 200. The flip-flop circuit of the first segment changes the voltage of the data output terminal Q1 from High level to Low level, after a little delay than the time that the first pulse is inputted into the clock terminal SCK. When the voltage of the data output terminal Q1 becomes Low level, the gate potential of the luminous thyristors d1, d2 is dropped.

Next, at time t4, when the signal of the data input terminal Odd and the data input terminal Even becomes High level from Low level, a potential difference between the anode and the cathode of the luminous thyristors d1 and d2 happens. Through trigger electricity caused by the potential difference, the luminous thyristors d1 and d2 simultaneously turns on to become a lightening state. The lightening state happened by the luminous thyristors d1 and d2 is mainly generated by the electricity which is supplied by the print controlling section via the respective signals of the data input terminal Odd and the data input terminal Even and flows between the anode and the cathode. In order to turn off the luminous thyristors d1 and d2 once turned on, it is necessary to drop the voltage supplied between the anode and the cathode into zero. Therefore, at time t5, the potentials of the data input terminal Odd and the data input terminal Even are set to Low level.

Moreover, as shown by the FIG. 6, in order to make the luminous thyristor d1 emit light, at the time t4, the signal of the data input terminal Odd is set to High level; in order to make the luminous thyristor d1 black out, at the time t5, the signal of the data input terminal Odd is set to Low level. In the case that the luminous thyristor d1 does not need to emit light, the signal of the data input terminal Odd may be kept in Low level from the time t4 to the time t5. Likewise, in order to make the luminous thyristor d2 emit light, at the time t4, the signal of the data input terminal Even is set to High level; in order to make the luminous thyristor d2 black out, at the time t5, the signal of the data input terminal Even is set to Low level. In the case that the luminous thyristor d2 does not need to emit light, the signal of the data input terminal Even may be kept in Low level from the time t4 to the time t5. Thus, through changing the value of the signal of the data input terminal Odd, the lightening state and the blackening state of the luminous thyristor d1 can be switched; and through changing the value of the signal of the data input terminal Even, the lightening state and the blackening state of the luminous thyristor d2 can be switched.

Then, at time t6, when second clock pulse is inputted into the clock terminal SCK, because the voltage supplied to the serial data input terminal SI becomes High level, after delayed a little time, on the one hand, the voltage of the data output terminal Q1 is changed from Low level to High level, on the other hand, the voltage of the data output terminal Q2 is changed from High level to Low level.

Next, at time t7, when the signals of the data input terminal Odd and the data input terminal Even become High level, a potential difference between the anode and the cathode of the luminous thyristors d3 and d4 happens. Through trigger electricity caused by the potential difference, the luminous thyristors d3 and d4 turn on to become a lightening state. The lightening state happened by the luminous thyristors d3 and d4 is mainly generated by the electricity which is supplied by the print controlling section via the respective signals of the data input terminal Odd and the data input terminal Even and flows between the anode and the cathode. In order to turn off the luminous thyristors d3 and d4 once turned on, it is necessary to drop the voltage supplied between the anode and the cathode to zero. Therefore, at time t8, the potentials of the data input terminal Odd and the data input terminal Even are set to Low level.

As shown by the FIG. 6, the clock signal supplied to the clock terminal SCK is High level in that marked by symbols 1, 2, 3, 4, 5, 6, 7, 8. Further, according to the clock signal, the respective voltages supplied to the data output terminals Q1, Q2, Q3, . . . , Q96 become Low level only by one time in an order of the data output terminals Q1, Q2, Q3, . . . , Q96. Except the data output terminals whose levels are Low, other data output terminals are High level. Therefore, when the signals of the data input terminal Odd and the data input terminal Even are High level, in the luminous thyristors d1, d2, . . . , d192 connected with the data output terminals Q1-Q96, only these luminous thyristors corresponding to the data output terminals Q1-Q96 whose output voltages are Low level are selected to emit light.

In the above explanation, on the one hand, in order to turn on the luminous thyristors d1, d2, . . . , d192, it is possible to only supply a voltage having a predetermined voltage value between the anode and the cathode along an ordinal direction; on the other hand, in order to turn off the luminous thyristors d1, d2, . . . , d4992, it is sufficient to only supply a voltage below the predetermined voltage value between the anode and the cathode along an ordinal direction. Therefore, through setting the voltage into zero or supplying a voltage between the anode and the cathode along a converse direction, it is possible to turn off the luminous thyristor.

Though the above stated operation represents lightening operation of the luminous thyristors d1-d8, likewise, the lightening operation of the luminous thyristors d9-d192 is also performed, and the lightening operation of the luminous thyristors d193-d4992 connected with the shift register circuits from the second segment to the twenty-sixth segment is also performed.

According to the embodiment 2, it is possible to obtain the same effect as the embodiment 1. Further, because the luminous thyristors d1, d2, ..., d192 are divided into two groups of an odd group of the luminous thyristors d1, d3, ..., d191 and an even group of the luminous thyristors d2, d4, ..., d192, and the luminous thyristors in respective groups are simultaneously controlled to drive, it is possible to shorten the time needed by the process of print line into ½ time.

Further, according to the embodiment 2, because the gate terminal G of two elements of luminous thyristors is connected with the respective terminals of the data output terminals Q1-Q96 furnished in the shift register circuit 200, as compared with the embodiment 1, the number of the data output terminals furnished in the shift register circuit, that is, the number of the flip-flop circuits FF is reduced to ½ part. Therefore, the semiconductor device can realize a reduction of cost. As a result, print head containing the semiconductor device also can realize a reduction of cost.

Transformation Example of Embodiment 2

Figure 7:
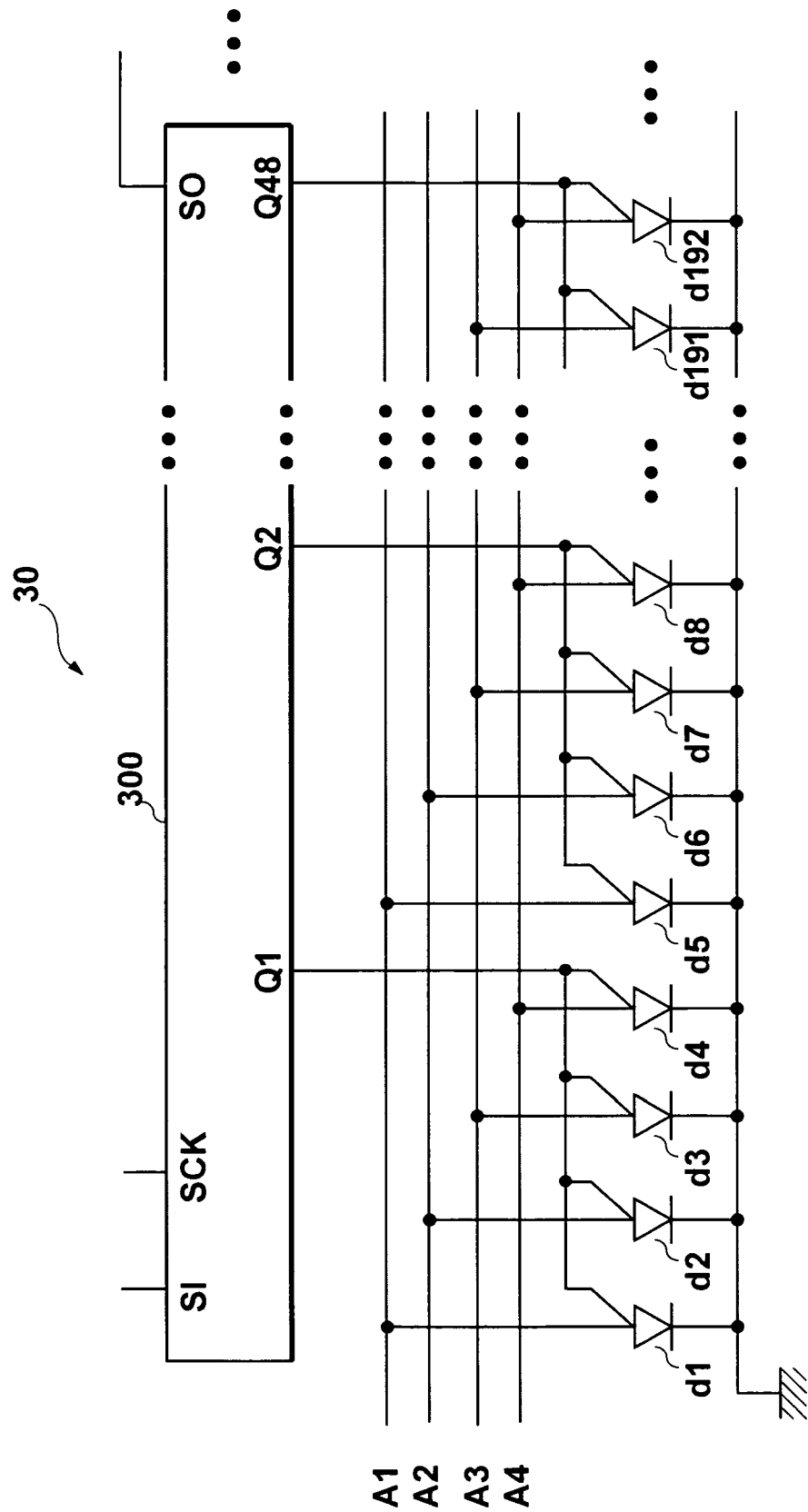
FIG. 7 is a circuit diagram showing a structure of a transformation example of print head in embodiment 2 of the present invention.

FIG. 7 is a circuit diagram showing a structure of a transformation example of print head in embodiment 2 of the present invention.

As shown by the FIG. 7, a semiconductor device to construct a print head 30 in a transformation example of embodiment 2 has a shift register circuit 300 and 192 pieces of luminous thyristors of luminous thyristors d1, d2, ..., d192 serving as light emitting element. In the shift register circuit 300, data output terminals Q1, Q2, ..., Q48 are furnished. The data output terminals Q1, Q2, ..., Q48 are respectively connected with gate terminal G of adjoining four luminous thyristors. For example, the data output terminal Q1 is connected with the gate terminal G of the luminous thyristors d1, d2, d3 and d4, the data output terminal Q2 is connected with the gate terminal G of the luminous thyristors d5, d6, d7 and d8. Further, in the shift register circuit 300, 48 pieces of the flip-flop circuits FF of the embodiment 1 are connected in series.

The luminous thyristors d1, d2, ..., d192 are the same as that in the embodiment 1. In the luminous thyristors d1, d2, ..., d192, anode terminals A of the luminous thyristors d1, d5, ..., d189 are connected with a data input terminal A1 of the print head; anode terminals A of the luminous thyristors d2, d6, ..., d190 are connected with a data input terminal A2 of the print head; anode terminals A of the luminous thyristors d3, d7, ..., d191 are connected with a data input terminal A3 of the print head; and anode terminals A of the luminous thyristors d4, d8, ..., d192 are connected with a data input terminal A4 of the print head. Further, cathode terminals K of the luminous thyristors d1, d2, ..., d192 are connected with a ground.

The print head 30 of the transformation example of the embodiment 2 includes 26 pieces of semiconductor devices shown by the FIG. 1, the shift register circuits 300 to construct the semiconductor device are connected in a cascade state of 26 segments. The serial data input terminal SI of shift register circuit 300 of first segment is connected with a serial data output terminal of a print controlling section, further, the serial data output terminal SO is connected with the serial data input terminal SI of the shift register circuit 300 of second segment. The serial data input terminal SI of the shift register circuit 300 of segments from second to twenty-sixth are respectively connected with the serial data output terminal SO of shift register circuit 300 of fore segment. In the print head 30, because 48 pieces of data output terminals are set in the shift register circuit 300 connected with the gate terminal G of four luminous thyristors, in all of the 26 segments of shift register circuits 300, the print head 30 has 2496 pieces of data output terminals. Therefore, the print head 30 has 4992 pieces of luminous thyristors and controls these luminous thyristors to drive.

According to the transformation example of the embodiment 2, it is possible to obtain the same effect as the embodiment 1. Further, because the luminous thyristors d1, d2, ..., d192 are divided into four groups of a first group of the luminous thyristors d1, d5, ..., d189, a second group of the luminous thyristors d2, d6, ..., d190, a third group of the luminous thyristors d3, d7, ..., d191, and a fourth group of the luminous thyristors d4, d8, ..., d192, and the luminous thyristors in respective groups are simultaneously controlled to drive, it is possible to shorten the time needed by the process of print line into ¼ time.

Further, according to the transformation example of the embodiment 2, because the gate terminal G of four elements of luminous thyristors is connected with the respective terminals of the data output terminals Q1-Q48 furnished in the shift register circuit 300, as compared with the embodiment 1, the number of the data output terminals furnished in the shift register circuit, that is, the number of the flip-flop circuits FF can be reduced to ¼ part. Therefore, the semiconductor device can more realize a reduction of cost. As a result, print head containing the semiconductor device also can more realize a reduction of cost.

Embodiment 3

Figure 8:
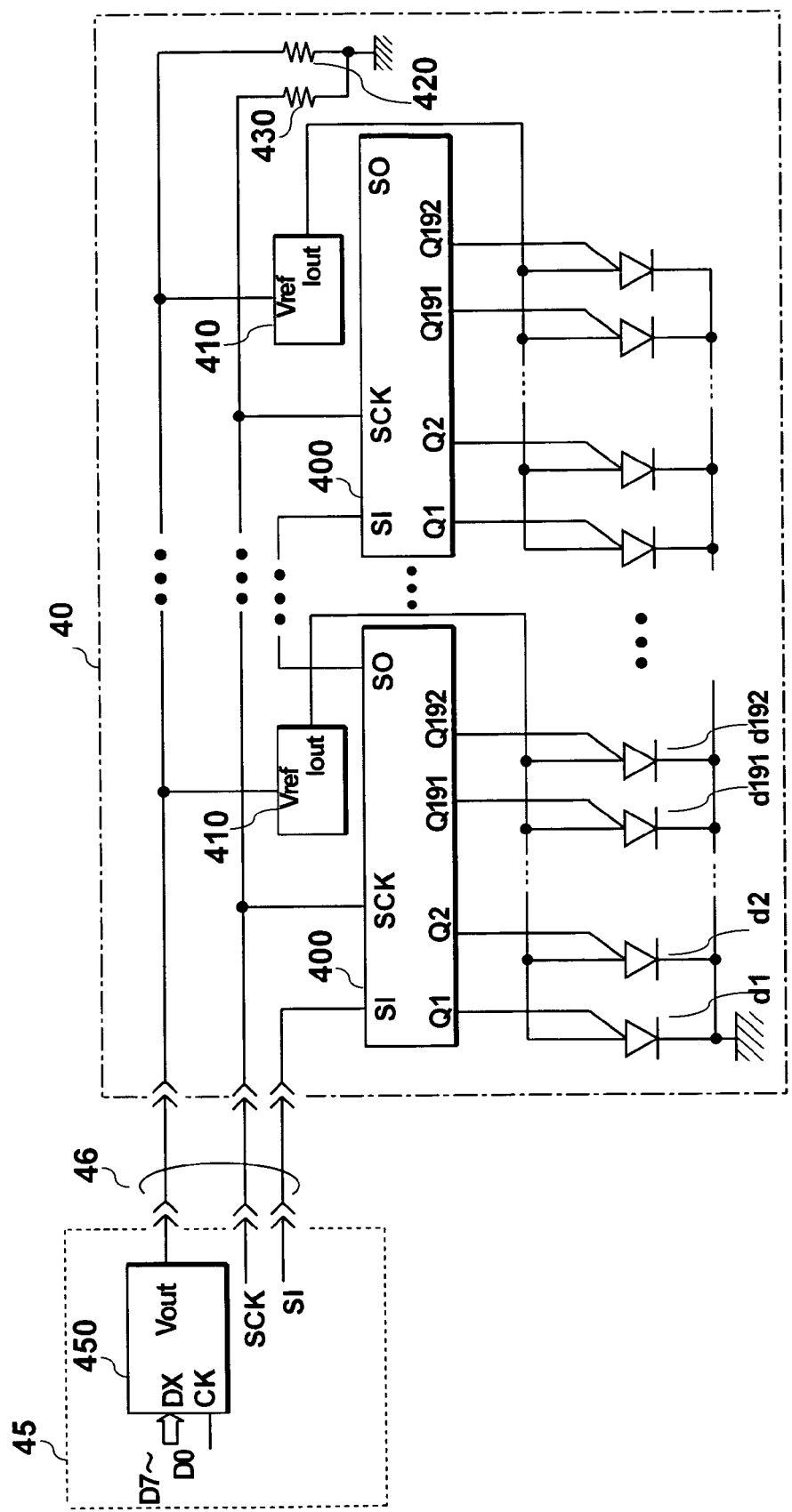
FIG. 8 is a circuit diagram showing a structure of print head in embodiment 3 of the present invention.

FIG. 8 is a circuit diagram showing a structure of print head in embodiment 3 of the present invention.

As shown by the FIG. 8, a semiconductor device to construct a print head 40 in embodiment 3 is connected with a print controlling section 45 via connection cable 46 and comprises 26 piece s of semiconductor devices and terminal resistors 420 and 430. Moreover, in order to supply power source to the print head 40, power source wire and ground wire are needed, but their representation are omitted in the FIG. 8.

Moreover, the print head 40 and the print controlling section 45 are used to form an image forming apparatus of the present invention. That is, the print head 40 and the print controlling section 45 are comprised in the image forming apparatus.

The semiconductor device to construct the print head 40 has a shift register circuit 400, a V-I converting circuit 410 and 192 pieces of luminous thyristors of luminous thyristors d1, d2, ..., d192 that are the same as that in the embodiment 1. In the shift register circuit 400, 192 pieces of flip-flop circuits FF (not shown) are connected in series.

Further, the shift register circuit 400 includes a serial data input terminal SI, a clock terminal SCK, a serial data output terminal SO and data output terminals Q1-Q192. In the shift register circuit 400 of first segment, the serial data input terminal SI is connected with a serial data output terminal SI of the print controlling section 45, the serial data input terminal SI of the shift register circuit 400 of other segment is connected with the serial data output terminal SO of fore segment. The clock terminal SCK is connected with a clock terminal of the print controlling section 45, and inputs a serial clock signal from the print controlling section 45. The serial data output terminal SO is connected with the serial data input terminal SI of the back segment. The data output terminals Q1-Q192 are respectively connected with gate terminals of the luminous thyristors d1, d2, . . . , d192.

The V-I converting circuit 410 has a terminal Vref to receive voltage supplied from a terminal Vout of a DA converting circuit 450 mentioned below, and a terminal Iout to supply drive electricity Iout to anode terminal A of luminous thyristor. Then, the V-I converting circuit 410 inputs a voltage Vout supplied from the terminal Vout of the DA converting circuit 450, generates the electricity Iout to supply to the anode terminals A of the luminous thyristors d1, d2, . . . , d192 from the voltage Vout, and outputs the generated electricity Iout to the anode terminals A of the luminous thyristors d1, d2, . . . , d192 from the terminal Iout.

Figure 9:
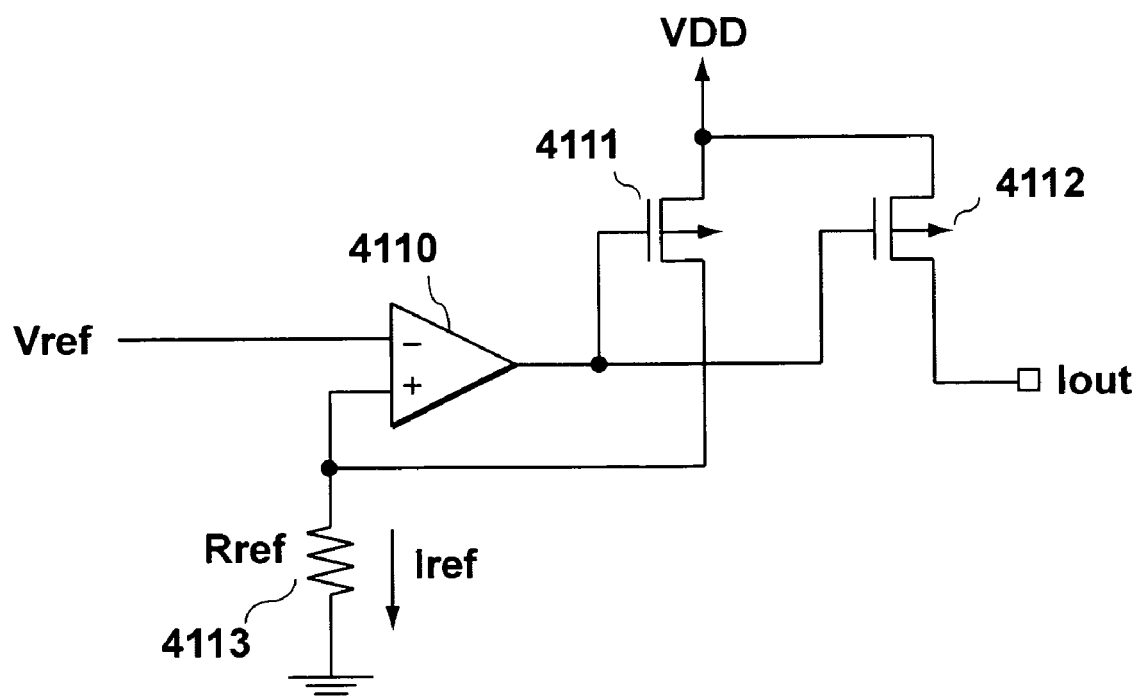
FIG. 9 is a circuit diagram showing a V-I converting circuit in FIG. 8.

FIG. 9 is a circuit diagram showing a V-I converting circuit in FIG. 8.

The V-I converting circuit 410 includes a calculation amplifier 4110, PMOS transistors 4111 and 4112, a resistor 4113. Here, the resistance value of the resistor 4113 is stated in the drawing as a Rref. A converse input terminal of the calculation amplifier 4110 is connected with the terminal Vref. Source terminals of the PMOS transistors 4111 and 4112 are connected with a power source VDD, a drain terminal of the PMOS transistor 4111 is connected with a terminal of the resistor 4113 and a non-converse input terminal of the calculation amplifier 4110. An output terminal of the calculation amplifier 4110 is connected with gate terminal s of the PMOS transistors 4111 and 4112. An other terminal of the resistor 4113 is connected with ground. A drain terminal of the PMOS transistor 4112 is connected with the terminal Iout.

In the PMOS transistors 4111 and 4112, their gate lengths and gate widths are set to the same, their voltage between gate and source are set to the same, the PMOS transistors 4111 and 4112 have a current mirror relation each other. The V-I converting circuit 410 is controlled by operation of the calculation amplifier 4110 so that the potentials of the converse input terminal and the non-converse input terminal about becomes equal, the electricity Iout flowing to the resistor 4113 has a relation of Iref=Vref/Rref.

As stated above, because the PMOS transistors 4111 and 4112 have a current mirror relation, the drain electricity of the PMOS transistor 4112 is approximately equal to the drain electricity of the PMOS transistor 4111 and is supplied by the electricity Iref. Thus, the electricity value Iref supplied to the luminous thyristors d1, d2, . . . , d192 from the terminal Iout furnished in the V-I converting circuit 410 is in scale with the potential Vref, the drive electricity of the luminous thyristors d1, d2, . . . , d192 also is controlled by the potential Vref, that is, by the output voltage of terminal Vout of the DA converting circuit 450 of the print controlling section 45.

As shown by the FIG. 8, the anode terminals A of the luminous thyristors d1, d2, . . . , d192 are connected each other and are connected with the terminal Iout furnished in the V-I converting circuit 410. Further, the cathode terminals K of the luminous thyristors d1, d2, . . . , d192 are connected with ground. The above description stated the structure of the semiconductor device to construct the print head 40.

The terminal resistors 420 and 430 to construct the print head 40 has a resistance value being approximately equal to character impedance of the connection cable 46. In the terminal resistor 420, one terminal is connected with the terminal Vout furnished in the DA converting circuit 450 included by the print controlling section 45, other terminal is grounded. In the terminal resistor 430, one terminal is connected with the clock terminal SCK of the print controlling section 45, and other terminal is connected with ground. Because the terminal resistor 420 and the terminal resistor 430 absorb signal reflection energy of signal sent to the connection cable 46 at wire terminal portion, it is possible to prevent the signal supplied to the connection cable 46 from reflecting from the wire terminal portion as reflection signal. And it is possible to release some trouble such as that the signal wave of voltage supplied to the terminal Vref of the semiconductor device happens change in different places of the print head 40.

The print head 40 of the embodiment 3 includes 26 piece s of semiconductor devices in a cascade connection. The serial data input terminal SI of shift register circuit 400 of first segment is connected with the serial data output terminal SI of the print controlling section, further, the serial data output terminal SO is connected with the serial data input terminal SI of the shift register circuit 400 of second segment. The serial data input terminal SI of the shift register circuit 400 of segments from second to twenty-sixth are respectively connected with the serial data output terminal SO of shift register circuit 400 of fore segment. Because each segment has 192 pieces of data output terminals in the shift register circuit 400, in all of the 26 segments of shift register circuits 400, the print head 40 has 4992 pieces of data output terminals. Therefore, the print head 40 has 4992 pieces of luminous thyristors and controls these luminous thyristors to drive. Moreover, the cathode terminal of each thyristor is ground.

The print controlling section 45 has a DA (Digit to Analog) converting circuit 450. The DA converting circuit 450 has a data input terminal DX to which digital signals D7-D0 composed of 8 bits are inputted, a terminal Vout to supply voltage generated on the basis of the digital signals D7-D0 to the terminal Vref furnished in the V-I converting circuit 410 of each semiconductor device in the print head 40, and a terminal CK to which clock signal is inputted for realizing a synchronization when sending the digital signals D7-D0. Moreover, the DA converting circuit 450 can be selected from various kinds only if it has a structure of voltage output type.

The digital signals D7-D0 are signals to regulate drive instruction value of 256 stage s as drive electricity Iout to make the luminous thyristors d1, d2, . . . , d192 emit light. Moreover, in the case that the signal inputted to the digital signals D7-D0 is hexadecimal "00", the voltage supplied to the terminal Vout is zero; in the case that the signal inputted to the digital signals D7-D0 is hexadecimal "FF" (it is equal to decimal "255"), the voltage supplied to the terminal Vout is a maximum.

Figure 10:
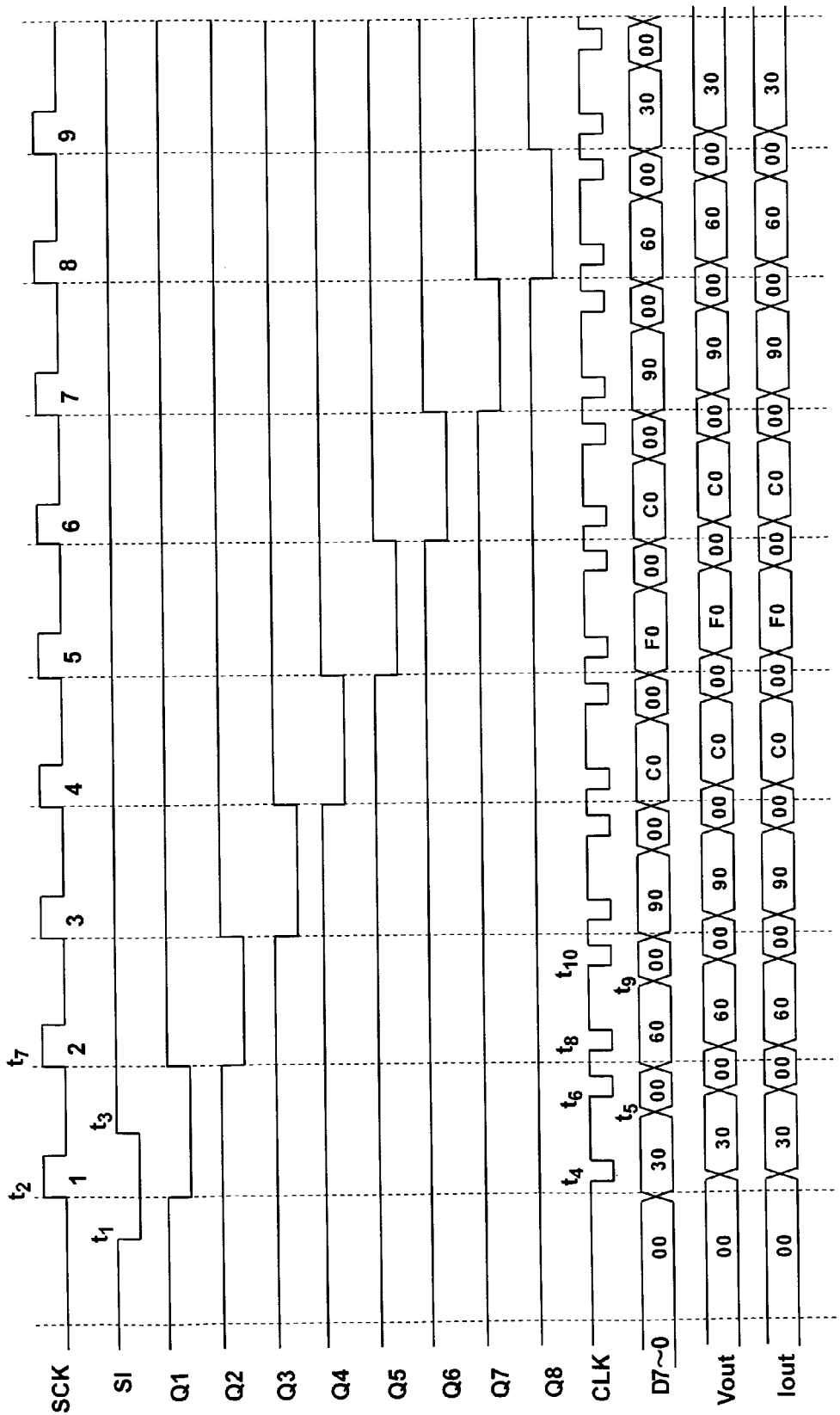
FIG. 10 is a timing chart for explaining operation of print head in embodiment 3 of the present invention.

FIG. 10 is a timing chart for explaining operation of print head in embodiment 3 of the present invention.

In the FIG. 10, the numerical values corresponding to the digital signals D7-D0, the voltage signal of the terminal Vout and the electricity of the terminal Iout of the V-I converting circuit 410 are numerical value examples for referring to when explaining operation, and they are shown by hexadecimal value. The FIG. 10 shows a movement status of one line while printing operation of printer and shows operation in the case to make the luminous thyristors d1, d2, . . . , d8 in the luminous thyristors d1, d2, . . . , d192 of FIG. 8 emit light sequentially. Further, though it is not shown in the FIG. 10, a presetting process of shift register circuit 400 is performed as a preparation operation while power source of printer is turned on. In the process, the voltage supplied on the serial data input terminal SI in FIG. 8 is set into High level, clock pulses whose number corresponds to the segment number of the shift register circuits are inputted into the clock terminal SCK. Thereby, all voltages supplied to the data output terminals Q1-Q192 of the shift register circuit 400 becomes High level.

As shown by the FIG. 10, at time t1, the voltage supplied to the serial data input terminal SI becomes Low level from High level before a movement of one line part. Next, at time t2, first clock pulse is inputted to the clock terminal SCK. Then, the Low level voltage supplied to the serial data input terminal SI is taken into the flip-flop circuit of the first segment of the shift register circuit 400. The flip-flop circuit of the first segment makes the voltage of the output terminal Q1 change to Low level from High level after a little delay than the time that the first pulse is inputted into the clock terminal SCK. When the voltage of the output terminal Q1 becomes Low level from High level, the gate potential of the luminous thyristor d1 also becomes Low level. Then, at time t3, the voltage supplied to the serial data input terminal SI returns to High level again.

And yet, after digital signal representing a hexadecimal number of "30" is inputted to the data input terminal DX, and clock signal is inputted into the clock terminal CLK at time t4, the DA converting circuit 450 takes data of the digital signals D7-D0 inputted to the data input terminal DX into inside, and outputs voltage Vout in scale with the numerical value to the terminal Vref of the V-I converting circuit 410. The V-I converting circuit 410 of the shift register circuit 400 of the first segment generates a fixed electricity Iout in scale with the voltage Vout, and supplies the fixed electricity Iout to the anode terminal A of the luminous thyristor d1 whose gate voltage is Low via the terminal Iout furnished in the shift register circuit 400 of the first segment.

Thereby, the luminous thyristor d1 occurs a potential difference between the anode and the cathode. Through trigger electricity caused by the potential difference, the luminous thyristor d1 turns on to become a lightening state. Moreover, because the drive electricity of the luminous thyristor d1 is equal to the fixed electricity Iout outputted from the terminal Iout of the V-I converting circuit 410 of the semiconductor device, the drive electricity becomes a value in scale with the voltage Vout supplied from the terminal Vout of the DA converting circuit 450.

Next, in order to turn off the luminous thyristor d1 once turned on, it is necessary to drop the voltage supplied between the anode and the cathode into zero. Therefore, at time t5, the print controlling section 45, after inputted digital signal representing a hexadecimal value of "00" to the data input terminal DX furnished in the DA converting circuit 450, at time t6, inputs the clock signal to the terminal CLK furnished in the DA converting circuit 450. Thereby, the DA converting circuit 450 takes into the data of the hexadecimal value of "00", and supplies the voltage of 0V to the terminal Vref of the V-I converting circuit 410 of the semiconductor device from the data of "00". The V-I converting circuit 410 outputs the electricity of 0 A corresponding to the voltage of 0V supplied from the DA converting circuit 450 to the luminous thyristors d1, d2, . . . , d192 from the terminal Iout. Therefore, the drive electricity of the luminous thyristor d1 is cut off and the luminous thyristor d1 becomes an off state.

Moreover, in order to make the luminous thyristor d1 emit light, at the time t4, the data input terminal DX furnished in the DA converting circuit 450 inputs the data of the hexadecimal value "30", and outputs the voltage Vout corresponding to the hexadecimal value to the terminal Vout of the DA converting circuit 450. Further, in order to make the luminous thyristor d1 black out, at the time t6, the data input terminal DX furnished in the DA converting circuit 450 inputs the data of the hexadecimal value "00", and outputs the voltage Vout of 0V corresponding to the hexadecimal value to the terminal Vout of the DA converting circuit 450. In the case that it is unnecessary to make the luminous thyristor d1 emit light, the print controlling section 45 may input an input data of a hexadecimal value of "00" to the data input terminal DX of the DA converting circuit 450 from the time 2 to the time 5.

Further, because the DA converting circuit 450 can supplies the voltage of 256 stage s to the terminal Vref of the V-I converting circuit 410 of the semiconductor device from the terminal Vout through the value inputted to the data input terminal DX, the V-I converting circuit 410 can make the drive electricity Iout outputted to the luminous thyristors d1, d2, . . . , d192 change according to the voltage of 256 stage s.

Then, at time t7, when second clock pulse is inputted into the clock terminal SCK, because the voltage supplied to the serial data input terminal SI becomes High level, on the one hand, after delayed a little time, the voltage of the data output terminal Q1 is changed from Low level to High level; on the other hand, the voltage of the data output terminal Q2 is changed from High level to Low level.

Next, at time t8, after clock signal is inputted to the clock terminal CK of the DA converting circuit 450 and a digital signal representing a hexadecimal value of "60" is inputted to the data input terminal DX, the DA converting circuit 450 takes the data into inside and supplies a voltage in scale with the numerical value to the terminal Vref of the V-I converting circuit 410 of the semiconductor device from the terminal Vout.

The V-I converting circuit 410 generates a fixed electricity Iout in scale with the voltage Vout supplied from the DA converting circuit 450, and supplies the fixed electricity Iout to the anode terminals A of the luminous thyristors d1, d2, . . . , d192 via the terminal Iout. Thereby, the luminous thyristor d2 occurs a potential difference between the anode and the cathode. Through trigger electricity caused by the potential difference, the luminous thyristor d2 turns on to become a lightening state. Moreover, except the luminous thyristor d2, the other luminous thyristors d1, d3, . . . , d192 becomes a blackening state since the voltages of the data output terminals Q1, Q3-Q192 are High level.

Because the lightening state of the luminous thyristor d2 is mainly generated by the electricity between the anode and the cathode, in order to turn off the luminous thyristor d2 once turned on, it is necessary to drop the voltage supplied between the anode and the cathode into zero. Therefore, at time t9, the print controlling section 45, after inputted digital signal representing a hexadecimal value of "00" to the data input terminal DX furnished in the DA converting circuit 450, at time t10, inputs the clock signal to the terminal CLK and sets the voltage supplied to the terminal Vout to zero. Then, the drive electricity Iout outputted from the terminal Iout of the V-I converting circuit 410 of the semiconductor device becomes 0V and the voltage between the between the anode and the cathode of the luminous thyristor d2 also becomes zero so that the luminous thyristor d2 is turned off.

As clearly explained above, at times shown by the symbols 1, 2, 3, 4, 5, 6, 7, 8 in the FIG. 10, whenever the SCK clock signal rises, in the voltages supplied to the data output terminals Q1-Q192 of the shift register circuit 400, only one output sequentially becomes Low level, other outputs becomes High level. Therefore, in the case that the digital signals D7-D0 inputted to the data input terminal DX of the DA converting circuit 450 is not represented to a hexadecimal value of "00", in the luminous thyristors d1, d2, . . . , d192 connected with the data output terminals Q1-Q192 of shift register circuit 400, only these luminous thyristor corresponding to the data output terminals Q1-Q192 that are supplied a Low level voltage are selected to emit light. Further, in the case that the digital signals D7-D0 inputted to the data input terminal DX of the DA converting circuit 450 is represented to a hexadecimal value of "00", it is needless to say that all of the luminous thyristors d1, d2, ..., d192 are in blackening state.

According to the embodiment 3, not only there is the effect of embodiment 1, but also there is the following effect: because the V-I converting circuit 410 can adjust the drive electricity outputted to the luminous thyristors d1, d2, ..., d192 into 255 stages, in the case that the lightening efficiency is different per luminous thyristor, it is possible to sequentially make the drive electricity value change whenever driving, and it is possible to adjust the lightening power into a predetermined value. As a result, in the manufacturing stage of the luminous thyristor, even if the lightening efficiencies are different due to a manufacture uneven, it is possible to use the luminous thyristor without disusing as waster. Therefore, the manufacture throughput in manufacture stage of the luminous thyristor can be obviously improved. So that it is possible to more reduce cost.

Transformation of Embodiment 3: 2 Division Drive

Figure 11:
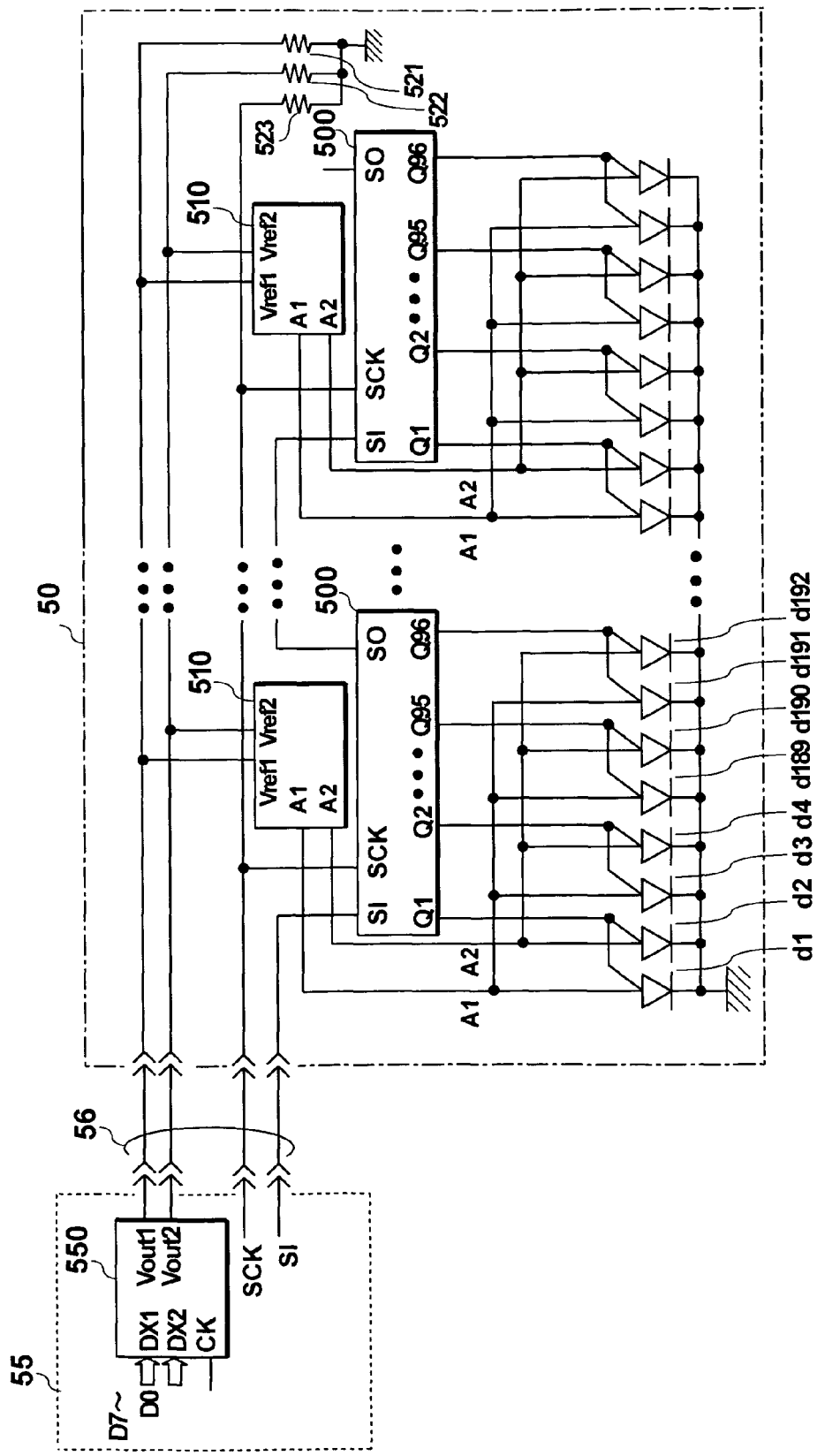
FIG. 11 is a circuit diagram showing a structure of one transformation example of print head in embodiment 3 of the present invention.

FIG. 11 is a circuit diagram showing a structure of one transformation example of print head in embodiment 3 of the present invention.

As shown by the FIG. 11, a print head 50 is connected with a print controlling section 55 via connection cable 56 and comprises 26 pieces of semiconductor devices and terminal resistors 521, 522 and 523. Moreover, in order to supply power source to the print head 50, power source wire and ground wire are needed, but their representation are omitted in the FIG. 11.

Moreover, the print head 50 and the print controlling section 55 are used to form another image forming apparatus of the present invention. That is, the print head 50 and the print controlling section 55 are comprised in the image forming apparatus.

The semiconductor device to construct the print head 50 has a shift register circuit 500, a V-I converting circuit 510 and 192 pieces of luminous thyristors of luminous thyristors d1, d2, ..., d192 that are the same as that in the embodiment 1. In the shift register circuit 500, 96 pieces of flip-flop circuits FF of the embodiment 1 (not shown) are connected in series.

Further, the shift register circuit 500 includes a serial data input terminal SI, a clock terminal SCK, a serial data output terminal SO and data output terminals Q1-Q192. In the shift register circuit 500 of first segment, the serial data input terminal SI is connected with a serial data output terminal SI of the print controlling section 55, the serial data input terminal SI of the shift register circuit 500 of other segment is connected with the serial data output terminal SO of fore segment. The clock terminal SCK is connected with a clock terminal SCK of the print controlling section 55, and inputs a serial clock signal from the print controlling section 55. The serial data output terminal SO is connected with the serial data input terminal SI of the back segment. The data output terminals Q1-Q96 are respectively connected with gate terminal of two luminous thyristors.

The V-I converting circuit 510 comprises two circuits shown by the FIG. 8, has a terminal Vref1 to receive voltage supplied from a terminal Vout1 of a DA converting circuit 550 mentioned below, a terminal Vref2 to receive voltage supplied from a terminal Vout2 of a DA converting circuit 550, and a terminal A1 to supply drive electricity A1 to anode terminals A of the luminous thyristors d1, d3, ..., d191, and a terminal A2 to supply drive electricity A2 to anode terminals A of the luminous thyristors d2, d4, ..., d192.

The anode terminals A of the luminous thyristors d1, d3, ..., d191 are connected each other and connected with the terminal A1 furnished in the V-I converting circuit 510, the anode terminals A of the luminous thyristors d2, d4, ..., d192 are connected each other and connected with the terminal A2 furnished in the V-I converting circuit 510. Further, the cathode terminals K of the luminous thyristors d1, d2, ..., d192 are connected with ground. The above description stated the structure of the semiconductor device to construct the print head 50.

The terminal resistors 521, 522 and 523 to construct the print head 50 has a resistance value being approximately equal to character impedance of the connection cable 56. In the terminal resistor 521, one terminal is connected with the terminal Vout1 furnished in the DA converting circuit 550 included by the print controlling section 55, other terminal is grounded. In the terminal resistor 522, one terminal is connected with the terminal Vout2 furnished in the DA converting circuit 550 included by the print controlling section 55, other terminal is grounded. In the terminal resistor 523, one terminal is connected with the clock terminal SCK of the print controlling section 55, and other terminal is connected with ground. Because the terminal resistors 521, 522 and 523 absorb signal reflection energy of signal sent to the connection cable 56 at wire terminal portion, it is possible to prevent the signal supplied to the connection cable 56 from reflecting from the wire terminal portion as reflection signal. And it is possible to release some trouble such as that the signal wave of voltage supplied to the terminal Vref1 and the terminal Vref2 of the V-I converting circuit 510 happens change in different places of the print head 50.

The print head 50 of the transformation example of the embodiment 3 includes 26 piece s of semiconductor devices in a cascade connection. The serial data input terminal SI of shift register circuit 500 of first segment is connected with the serial data output terminal SI of the print controlling section 55, further, the serial data output terminal SO is connected with the serial data input terminal SI of the shift register circuit 500 of second segment. The serial data input terminal SI of the shift register circuit 500 of segments from second to twenty-sixth are respectively connected with the serial data output terminal SO of shift register circuit 500 of fore segment. Because each segment to connect two luminous thyristors has 96 pieces of data output terminals in the shift register circuit 500, in all of the 26 segments of shift register circuits 500, the print head 50 has 4992 pieces of data output terminals. Therefore, the print head 50 has 4992 pieces of luminous thyristors and controls these luminous thyristors to drive. Moreover, the cathode terminal of each thyristor is ground.

The print controlling section 55 has a DA converting circuit 550. The DA converting circuit 550 has data input terminals DX1 and DX2 to which digital signals D7-D0 composed of 8 bits are inputted, a terminal Vout1 to supply voltage generated on the basis of the digital signals D7-D0 inputted to the data input terminal DX1 to the terminal Vref1 furnished in the V-I converting circuit 510 of each semiconductor device in the print head 50, a terminal Vout2 to supply voltage generated on the basis of the digital signals D7-D0 inputted to the data input terminal DX2 to the terminal Vref2 furnished in the V-I converting circuit 510 of each semiconductor device in the print head 50, and a terminal CK to which clock signal is inputted for realizing a synchronization when sending the digital signals D7-D0. Moreover, the DA converting circuit 550 is the same as that in the embodiment 3, and can be selected from various kinds only if it has a structure of voltage output type.

The digital signals D7-D0 are the same as that in the embodiment 3 and are signals to regulate drive instruction value of 256 stages as drive electricity Iout to make the luminous thyristors d1, d2, . . . , d192 emit light. Moreover, in the case that the signal inputted to the digital signals D7-D0 is hexadecimal value of "00", the voltage supplied to the terminal Vout is zero; in the case that the signal inputted to the digital signals D7-D0 is hexadecimal value of "FF" (it is equal to decimal "255"), the voltage supplied to the terminal Vout is a maximum.

Because the print head 50 performs the same operation as that in the embodiment 3, its explanation is omitted.

According to the transformation of the embodiment 3, not only there is the effect of embodiment 3, but also there is the following effect: in the luminous thyristors d1, d2, . . . , d192, two groups of a group of luminous thyristors d1, d3, . . . , d191 and a group of the luminous thyristors d2, d4, . . . , d192 are simultaneously controlled to drive in parallel, therefore, as compared with the embodiment 3, it is possible to shorten the time needed by the process of print line into ½ time.

Further, according to the transformation of the embodiment 3, because the gate terminal G of two elements of luminous thyristors is connected with the respective terminals of the data output terminals Q1-Q96 furnished in the shift register circuit 500, as compared with the embodiment 3, the number of the data output terminals furnished in the shift register circuit 500, that is, the number of the flip-flop circuits FF is reduced to ½ part. Therefore, the shift register circuit also can realize a reduction of cost with respect to itself.

Transformation of Embodiment 3: 4 Division Drive

Figure 12:
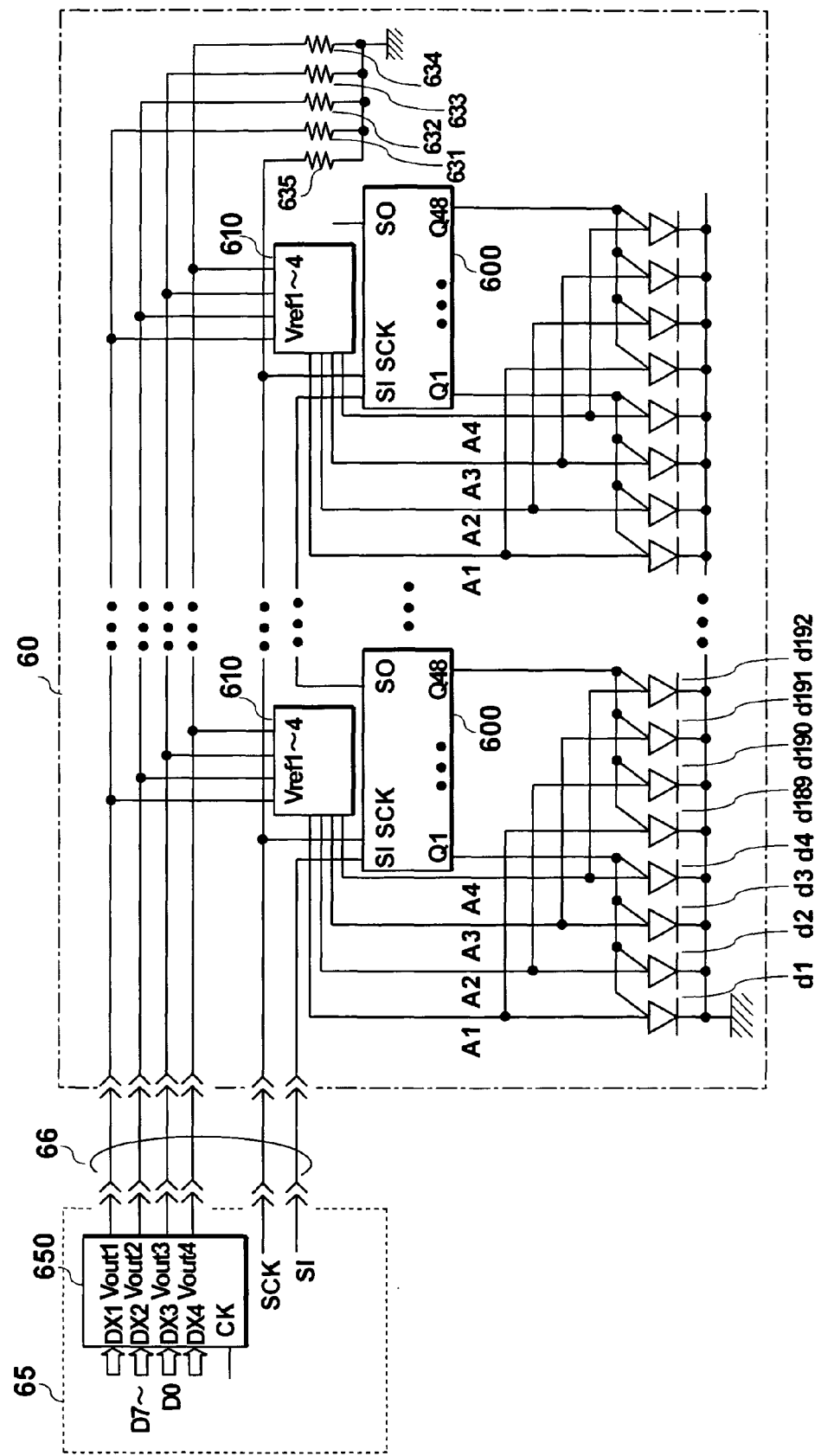
FIG. 12 is a circuit diagram showing a structure of another transformation example of print head in embodiment 3 of the present invention.

FIG. 12 is a circuit diagram showing a structure of another transformation example of print head in embodiment 3 of the present invention.

As shown by the FIG. 12, a print head 60 is connected with a print controlling section 65 via connection cable 66 and comprises 26 pieces of semiconductor devices and terminal resistors 631, 632, 633, 634, 635. Moreover, in order to supply power source to the print head 60, power source wire and ground wire are needed, but their representation are omitted in the FIG. 12.

Moreover, the print head 60 and the print controlling section 65 are used to form another image forming apparatus of the present invention. That is, the print head 60 and the print controlling section 65 are comprised in the image forming apparatus.

The semiconductor device to construct the print head 60 has a shift register circuit 600, a V-I converting circuit 610 and 192 pieces of luminous thyristors of luminous thyristors d1, d2, . . . , d192 that are the same as that in the embodiment 1. In the shift register circuit 600, 96 pieces of flip-flop circuits FF of the embodiment 1 (not shown) are connected in series.

Further, the shift register circuit 600 includes a serial data input terminal SI, a clock terminal SCK, a serial data output terminal SO and data output terminals Q1-Q48. In the shift register circuit 600 of first segment, the serial data input terminal SI is connected with a serial data output terminal SI of the print controlling section 65, the serial data input terminal SI of the shift register circuit 600 of other segment is connected with the serial data output terminal SO of fore segment. The clock terminal SCK is connected with a clock terminal SCK of the print controlling section 65, and inputs a serial clock signal from the print controlling section 65. The serial data output terminal SO is connected with the serial data input terminal SI of the back segment. The data output terminals Q1-Q48 are respectively connected with gate terminal of four luminous thyristors.

The V-I converting circuit 610 comprises four circuits shown by the FIG. 8, has a terminal Vref1 to receive voltage supplied from a terminal Vout1 of a DA converting circuit 650 mentioned below, a terminal Vref2 to receive voltage supplied from a terminal Vout2 of the converting circuit 650, a terminal Vref3 to receive voltage supplied from a terminal Vout3 of the converting circuit 650, a terminal Vref4 to receive voltage supplied from a terminal Vout4 of the converting circuit 650, a terminal A1 to supply drive electricity A1 to anode terminals A of the luminous thyristors d1, d5, . . . , d189, a terminal A2 to supply drive electricity A2 to anode terminals A of the luminous thyristors d2, d6, . . . , d190, a terminal A3 to supply drive electricity A3 to anode terminals A of the luminous thyristors d3, d7, . . . , d191, and a terminal A4 to supply drive electricity A4 to anode terminals A of the luminous thyristors d4, d8, . . . , d192.

The anode terminals A of the luminous thyristors d1, d5, . . . , d189 are connected each other and connected with the terminal A1 furnished in the V-I converting circuit 610; the anode terminals A of the luminous thyristors d2, d6, . . . , d190 are connected each other and connected with the terminal A2 furnished in the V-I converting circuit 610; the anode terminals A of the luminous thyristors d3, d7, . . . , d191 are connected each other and connected with the terminal A3 furnished in the V-I converting circuit 610; and the anode terminals A of the luminous thyristors d4, d8, . . . , d192 are connected each other and connected with the terminal A4 furnished in the V-I converting circuit 610. Further, the cathode terminals K of the luminous thyristors d1, d2, . . . , d192 are connected with ground. The above description stated the structure of the semiconductor device to construct the print head 60.

The terminal resistors 631, 632, 633, 634, 635 to construct the print head 60 has a resistance value being approximately equal to character impedance of the connection cable 66. In the terminal resistor 631, one terminal is connected with the terminal Vout1 furnished in the DA converting circuit 650 included by the print controlling section 65, other terminal is grounded. In the terminal resistor 632, one terminal is connected with the terminal Vout2 furnished in the DA converting circuit 650 included by the print controlling section 65, other terminal is grounded. In the terminal resistor 633, one terminal is connected with the terminal Vout3 furnished in the DA converting circuit 650 included by the print controlling section 65, other terminal is grounded. In the terminal resistor 634, one terminal is connected with the terminal Vout4 furnished in the DA converting circuit 650 included by the print controlling section 65, other terminal is grounded. In the terminal resistor 635, one terminal is connected with the clock terminal SCK of the print controlling section 65, and other terminal is connected with ground. Because the terminal resistors 631, 632, 633, 634, 635 absorb signal reflection energy of signal sent to the connection cable 66 at wire terminal portion, it is possible to prevent the signal supplied to the connection cable 66 from reflecting from the wire terminal portion as reflection signal. And it is possible to release some trouble such as that the signal wave of voltage supplied to the terminals Vref1, Vref2, Vref3, and Vref4 of the V-I converting circuit 610 happens change in different places of the print head 60.

The print head 60 of the another transformation example of the embodiment 3 includes 26 piece s of semiconductor devices in a cascade connection. The serial data input terminal SI of shift register circuit 600 of first segment is connected with the serial data output terminal SI of the print controlling section 65, further, the serial data output terminal SO is connected with the serial data input terminal SI of the shift register circuit 600 of second segment. The serial data input terminal SI of the shift register circuit 600 of segments from second to twenty-sixth are respectively connected with the serial data output terminal SO of shift register circuit 600 of fore segment. Because each segment to connect four luminous thyristors has 48 pieces of data output terminals in the shift register circuit 600, in all of the 26 segments of shift register circuits 600, the print head 60 has 4992 pieces of data output terminals. Therefore, the print head 60 has 4992 pieces of luminous thyristors and controls these luminous thyristors to drive.

The print controlling section 65 has a DA converting circuit 650. The DA converting circuit 650 has data input terminals DX1, DX2, DX3 and DX4 to which digital signals D7-D0 composed of 8 bits are inputted, a terminal Vout1 to supply voltage generated on the basis of the digital signals D7-D0 inputted to the data input terminal DX1 to the terminal Vref1 furnished in the V-I converting circuit 610 of each semiconductor device in the print head 60, a terminal Vout2 to supply voltage generated on the basis of the digital signals D7-D0 inputted to the data input terminal DX2 to the terminal Vref2 furnished in the V-I converting circuit 610 of each semiconductor device in the print head 60, a terminal Vout3 to supply voltage generated on the basis of the digital signals D7-D0 inputted to the data input terminal DX3 to the terminal Vref3 furnished in the V-I converting circuit 610 of each semiconductor device in the print head 60, a terminal Vout4 to supply voltage generated on the basis of the digital signals D7-D0 inputted to the data input terminal DX4 to the terminal Vref4 furnished in the V-I converting circuit 610 of each semiconductor device in the print head 60, and a terminal CK to which clock signal is inputted for realizing a synchronization when sending the digital signals D7-D0. Moreover, the DA converting circuit 650 is the same as that in the embodiment 3, and can be selected from various kinds only if it has a structure of voltage output type.

The digital signals D7-D0 are the same as that in the embodiment 3 and are signals to regulate drive instruction value of 256 stages as drive electricity Iout to make the luminous thyristors d1, d2, . . . , d192 emit light. Moreover, in the case that the signal inputted to the digital signals D7-D0 is hexadecimal value of "00", the voltage supplied to the terminal Vout is zero; in the case that the signal inputted to the digital signals D7-D0 is hexadecimal value of "FF" (it is equal to decimal "255"), the voltage supplied to the terminal Vout is a maximum.

Because the print head 60 performs the same operation as that in the embodiment 3, its explanation is omitted.

According to the another transformation of the embodiment 3, not only there is the effect of embodiment 3, but also there is the following effect: in the luminous thyristors d1, d2, . . . , d192, four groups of a group of luminous thyristors d1, d5, . . . , d189, a group of the luminous thyristors d2, d6, . . . , d190, a group of luminous thyristors d3, d7, . . . , d191, and a group of the luminous thyristors d4, d8, . . . , d192 are simultaneously controlled to drive in parallel, therefore, as compared with the embodiment 3, it is possible to shorten the time needed by the process of print line into ¼ time.

Further, according to the another transformation of the embodiment 3, because the gate terminal G of four elements of luminous thyristors is connected with the respective terminals of the data output terminals Q1-Q48 furnished in the shift register circuit 600, as compared with the embodiment 3, the number of the data output terminals furnished in the shift register circuit 600, that is, the number of the flip-flop circuits FF is reduced to ¼ part. Therefore, the shift register circuit also can realize a reduction of cost with respect to itself.

In the above stated embodiment 1-3, it explained in detail the structure, the drive circuit and the drive method in the case to use luminous thyristor in light source of the print head of printer of electronic photograph. However, the same method also can be applied to luminous transistor, organic EL element or the like.

The present invention is not limited to the foregoing embodiments but many modifications and variations are possible within the spirit and scope of the appended claims of the invention.

What is claimed is:

1. A semiconductor device, comprising:
    a plurality of light emitting elements, each of the light emitting elements having first and second electrodes through which electricity flows to generate light and a third electrode to control the light emitting element; and
    a shift register circuit that has output terminals respectively connected to the third electrodes of the light emitting elements and that stores data for controlling the light emitting elements; and
    a V-I converting circuit having a first terminal that receives a voltage from outside the semiconductor device and having a second terminal that is connected to the first electrodes of the light emitting elements and supplies drive power to the first electrodes.

2. A print head which radiates light for forming an electrostatic latent image onto a photosensitive drum, comprising:
    a plurality of semiconductor devices connected in a cascade arrangement,
    wherein each semiconductor device includes:
        a plurality of light emitting elements, each of the light emitting elements having first and second electrodes through which electricity flows to generate light and a third electrode to control the light emitting element;
        a shift register circuit that has output terminals respectively connected to the third electrodes of the light emitting elements and that stores data for controlling of the light emitting elements; and
        a V-I converting circuit having a first terminal that receives a voltage from outside the print head and having a second terminal that is connected to the first electrodes of the light emitting elements and supplies drive power to the first electrodes.

3. An image forming apparatus, comprising:
    a print controlling section; and
    a print head that is connected to the print controlling section and that radiates light for forming an electrostatic latent image onto a photosensitive drum,
    wherein the print head comprises a plurality of semiconductor devices connected in a cascade arrangement, and
    wherein each semiconductor device includes:
        a plurality of light emitting elements, each of the light emitting elements having first and second electrodes through which electricity flows to generate light and a third electrode to control the light emitting element;
        a shift register circuit that has output terminals respectively connected to the third electrodes of the light emitting elements and that stores data for controlling the light emitting elements; and
        a V-I converting circuit having a first terminal that receives a voltage from the print controlling section and having a second terminal that is connected to the first electrodes of the light emitting elements and supplies drive power to the first electrodes.

4. The semiconductor device according to claim 1, wherein the V-I converting circuit additionally has at least one further first terminal that receives a further voltage from outside the semiconductor device and at least one further second terminal, wherein the plurality of light emitting elements forms a group of light emitting elements, and further comprising at least one further group of light emitting elements having first and second electrodes through which electricity flows to generate light and a third electrode to control the light emitting element, each at least one further group of light emitting elements corresponding to a respective further second terminal of the V-I converting circuit and the first electrodes thereof being to connected one another and to the corresponding further second terminal of the V-I converting circuit.

5. The semiconductor device according to claim 1, wherein the V-I converting circuit converts the voltage received from outside the semiconductor device to drive current for driving the light emitting elements.

6. The print head according to claim 2, further comprising:
a wire which is connected to the first terminals of the V-I converting circuits in the semiconductor devices in common and which supplies the voltage received from outside the print head to the first terminals, the wire being connected to a cable that is connected to the print head and that has a characteristic impedance; and
a terminal resistor connected to the wire, the terminal resistor having a resistance value that is approximately equal to the characteristic impedance of the cable.

7. The print head according to claim 2, wherein the V-I converting circuit of each semiconductor device additionally has at least one further first terminal that receives a further voltage from outside the print head and at least one further second terminal, wherein the plurality of light emitting elements of each semiconductor device forms a group of light emitting elements, and further comprising at least one further group of light emitting elements having first and second electrodes through which electricity flows to generate light and a third electrode to control the light emitting element, each at least one further group of light emitting elements corresponding to a respective further second terminal of the V-I converting circuit and the first electrodes thereof being to connected one another and to the corresponding further second terminal of the V-I converting circuit.

8. The print head according to claim 2, wherein the V-I converting circuit of each semiconductor device converts the voltage received from outside the print head to drive current for driving the light emitting elements.

9. The image forming apparatus according to claim 3, further comprising:
a cable having a characteristic impedance;
a wire which is connected in common to the first terminals of the V-I converting circuits in the semiconductor devices and which supplies the voltage received via the cable from outside the print head to the first terminals; and
a terminal resistor connected to the wire, the terminal resistor having a resistance value that is approximately equal to the characteristic impedance of the cable.

10. The image forming apparatus according to claim 3, wherein the V-I converting circuit of each semiconductor device additionally has at least one further first terminal that receives further a voltage from the print controlling section and at least one further second terminal, wherein the plurality of light emitting elements of each semiconductor device forms a group of light emitting elements, and further comprising at least one further group of light emitting elements having first and second electrodes through which electricity flows to generate light and a third electrode to control the light emitting element, each at least one further group of light emitting elements corresponding to a respective further second terminal of the V-I converting circuit and the first electrodes thereof being to connected one another and to the corresponding further second terminal of the V-I converting circuit.

11. The image forming apparatus according to claim 3, wherein the V-I converting circuit of each semiconductor device converts the voltage received from the print controlling section to drive current for driving the light emitting elements.

12. The image forming apparatus according to claim 11, wherein the print controlling section comprises a digital-to-analog converter that generates the voltage based on digital signals that specify intensity values for light emitted by the light emitting elements.

* * * * *